United States Patent
Shah et al.

(10) Patent No.: US 10,685,318 B2
(45) Date of Patent: Jun. 16, 2020

(54) CONCEPTS FOR ADDRESS PREDICTION OR CORRECTION

(71) Applicant: UNITED PARCEL SERVICE OF AMERICA, INC., Atlanta, GA (US)

(72) Inventors: Milin Shah, Cumming, GA (US); Michael Roush, Milton, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 871 days.

(21) Appl. No.: 14/609,890

(22) Filed: Jan. 30, 2015

(65) Prior Publication Data
US 2016/0224937 A1    Aug. 4, 2016

Related U.S. Application Data

(63) Continuation of application No. 14/609,570, filed on Jan. 30, 2015, now abandoned.

(51) Int. Cl.
*G06Q 10/08*    (2012.01)

(52) U.S. Cl.
CPC ....... *G06Q 10/0838* (2013.01); *G06Q 10/083* (2013.01)

(58) Field of Classification Search
CPC .................................................. G06Q 10/083
USPC ......................................................... 705/341
See application file for complete search history.

(56) References Cited

U.S. PATENT DOCUMENTS

| | | | | |
|---|---|---|---|---|
| 7,657,540 B1 * | 2/2010 | Bayliss | ................. | G06F 16/283 707/999.1 |
| 8,103,716 B2 * | 1/2012 | Boyce | .................... | G06Q 10/08 705/401 |
| 8,306,923 B1 | 11/2012 | Roache et al. | | |
| 8,990,637 B1 * | 3/2015 | Vlachogiannis | ........ | G06F 9/542 714/47.1 |
| 2002/0181466 A1 * | 12/2002 | Neustein | .............. | G06Q 10/107 370/393 |
| 2003/0114206 A1 * | 6/2003 | Timothy | ............... | G06F 1/1626 455/575.7 |
| 2011/0098846 A1 * | 4/2011 | Yeung | ...................... | B07C 3/12 700/224 |
| 2011/0307476 A1 * | 12/2011 | Sharma | ................. | G06F 16/313 707/723 |

(Continued)

FOREIGN PATENT DOCUMENTS

CA    2404814 A1    10/2001

OTHER PUBLICATIONS

Improving Prediction for Procedure Returns with Return-Address-Stack Repair Mechanisms by Department of Computer Science and Electrical Engineering Princton University (Year: 1998).*
Non-Final Rejection dated Aug. 10, 2017 for U.S. Appl. No. 14/609,914.

(Continued)

*Primary Examiner* — Jeff Zimmerman
*Assistant Examiner* — Zeina Elchanti
(74) *Attorney, Agent, or Firm* — Shook, Hardy & Bacon L.L.P.

(57) ABSTRACT

Computer program products, methods, systems, apparatus, and computing entities are provided for predicting and correcting addresses. In one embodiment, this includes applying exception rules to determine whether to generate an exception for an address. If an exception exists, there are various approaches for predicting or correcting the addresses.

19 Claims, 9 Drawing Sheets

(56) References Cited

U.S. PATENT DOCUMENTS

| | | | |
|---|---|---|---|
| 2012/0117163 A1* | 5/2012 | Lester | G06F 16/2365 |
| | | | 709/206 |
| 2014/0201508 A1* | 7/2014 | Busaba | G06F 9/38 |
| | | | 712/239 |
| 2015/0081343 A1* | 3/2015 | Streebin | G06Q 10/08345 |
| | | | 705/4 |
| 2015/0081587 A1 | 3/2015 | Gillen | |

OTHER PUBLICATIONS

Non-Final Rejection dated Aug. 10, 2017 for U.S. Appl. No. 14/609,570.
Non-Final Rejection dated Oct. 3, 2017 for U.S. Appl. No. 14/610,023.
CA Office Action dated Sep. 15, 2017 for CA Application No. 2919526.
Canadian Intellectual Property Office, Requisition by the Examiner for Application No. 2,919,526, dated Feb. 3, 2017, 4 pages, Canada.
Final Rejection dated Jan. 26, 2018 for U.S. Appl. No. 14/610,023.
Final Rejection dated Jan. 26, 2018 for U.S. Appl. No. 14/609,570.
Final Rejection dated Jan. 25, 2018 for U.S. Appl. No. 14/609,914.
Office Action received for Canadian Patent Application No. 2,919,526, dated Jan. 16, 2020, 11 pages.

* cited by examiner

| | |
|---|---|
| Number | 122 |
| Number Fractional | |
| Pre-Directional | |
| Pre-Qualifier | |
| Pre-Type | |
| Pre-Article | |
| Name | Main |
| Post-Article | |
| Suffix | Street |
| Post-Qualifier | |
| Post Directional | |
| Suite Type | |
| Suite Number | |
| City | Any Town |
| State | Georgia |
| Zip Code | 30328 |
| Country | United States |
| Post Office Box Type | |
| Post Office Box Number | |
| Geocode | |
| Longitude and Latitude | |
| Title | Mr. |
| Given Name | John |
| Surname | Doe |
| Suffix | |
| Nickname | |

Fig. 5

| Address Element | Address Data | Overall Confidence Level |
|---|---|---|
| Number | 123 | 91 |
| Number Fractional | | |
| Pre-Directional | | |
| Pre-Qualifier | | |
| Pre-Type | | |
| Pre-Article | | |
| Name | Main | |
| Post-Article | | |
| Suffix | Street | |
| Post-Qualifier | | |
| Post Directional | | |
| Suite Type | Apartment | |
| Suite Number | 1A | |
| City | Any Town | |
| State | Georgia | |
| Zip Code | 30328 | |
| Country | United States | |
| Post Office Box Type | | |
| Post Office Box Number | | |
| Geocode | | |
| Longitude and Latitude | | |

Fig. 6

| Name Element | Name Data | Overall Confidence Level | Combined Confidence Level |
|---|---|---|---|
| Name Prefix | Mr. | 97 | 94 |
| First Name | John | | |
| Middle Name or Initial | | | |
| Last Name | Doe | | |
| Name Suffix | | | |
| Nickname | | | |

| Address Element | Address Data | Overall Confidence Level | |
|---|---|---|---|
| Number | 123 | 91 | |
| Number Fractional | | | |
| Pre-Directional | | | |
| Pre-Qualifier | | | |
| Pre-Type | | | |
| Pre-Article | | | |
| Name | Main | | |
| Post-Article | | | |
| Suffix | Street | | |
| Post-Qualifier | | | |
| Post Directional | | | |
| Suit Type | Apartment | | |
| Suite Number | 1A | | |
| City | Any Town | | |
| State | Georgia | | |
| Zip Code | 30328 | | |
| Country | United States | | |
| Post Office Box Type | | | |
| Post Office Box Number | | | |
| Geocode | | | |
| Longitude and Latitude | | | |

Fig. 7

| Name Element | Name Data | Element Confidence Levels | Overall Confidence Level | Combined Confidence Level |
|---|---|---|---|---|
| Name Prefix | Mr. | 97 | 97 | 94.0 |
| First Name | John | 95 | | |
| Middle Name or Initial | | | | |
| Last Name | Doe | 99 | | |
| Name Suffix | | | | |
| Nickname | | | | |

| Address Element | Address Data | Element Confidence Levels | Overall Confidence Level | |
|---|---|---|---|---|
| Number | 123 | 88 | 91 | |
| Number Fractional | | | | |
| Pre-Directional | | | | |
| Pre-Qualifier | | | | |
| Pre-Type | | | | |
| Pre-Article | | | | |
| Name | Main | 87 | | |
| Post-Article | | | | |
| Suffix | Street | 87 | | |
| Post-Qualifier | | | | |
| Post Directional | | | | |
| Suite Type | Apartment | 90 | | |
| Suite Number | 1A | 90 | | |
| City | Any Town | 94 | | |
| State | Georgia | 98 | | |
| Zip Code | 30328 | 89 | | |
| Country | United States | 99 | | |
| Post Office Box Type | | | | |
| Post Office Box Number | | | | |
| Geocode | | | | |
| Longitude and Latitude | | | | |

Fig. 8

| Address Element | Address Data | Overall Confidence Level |
|---|---|---|
| Number | 123 | 91 |
| Number Fractional | | |
| Pre-Directional | | |
| Pre-Qualifier | | |
| Pre-Type | | |
| Pre-Article | | |
| Name | Main | |
| Post-Article | | |
| Suffix | Street | |
| Post-Qualifier | | |
| Post Directional | | |
| Suite Type | Apartment | |
| Suite Number | 1A | |
| City | Any Town | |
| State | Georgia | |
| Zip Code | 30328 | |
| Country | United States | |
| Post Office Box Type | | |
| Post Office Box Number | | |
| Geocode | | |
| Longitude and Latitude | | |

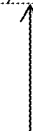

| | |
|---|---|
| Number | 122 |
| Number Fractional | |
| Pre-Directional | |
| Pre-Qualifier | |
| Pre-Type | |
| Pre-Article | |
| Name | Main |
| Post-Article | |
| Suffix | Street |
| Post-Qualifier | |
| Post Directional | |
| Suite Type | |
| Suite Number | |
| City | Any Town |
| State | Georgia |
| Zip Code | 30328 |
| Country | United States |
| Post Office Box Type | |
| Post Office Box Number | |
| Geocode | |
| Longitude and Latitude | |
| Title | Mr. |
| Given Name | John |
| Surname | Doe |
| Suffix | |
| Nickname | |

Fig. 9

CONCEPTS FOR ADDRESS PREDICTION OR CORRECTION

CROSS-REFERENCE TO RELATED APPLICATIONS

This application is a continuation of U.S. application Ser. No. 14/609,570 filed Jan. 30, 2015, which is hereby incorporated herein in its entirety by reference.

BACKGROUND

In picking up items from and delivering items to customers (e.g., consignors and/or consignees), carriers often rely on the address information/data provided by the customers. This address information/data can include errors and/or be incomplete. Current solutions determine whether the address information/data provided by the customer is within "range." That is, current solutions determine whether a number or a number fractional is within the specified range assigned to a given street, road, avenue, and/or the like. However, current solutions do not determine whether the provided address information/data actually exists, whether any address information/data is missing, and/or whether the specified consignors/consignees have moved. Thus, a solution is needed to provide address information/data in the event of incorrect, incomplete, and/or changed address information/data.

BRIEF SUMMARY

In general, embodiments of the present invention provide methods, apparatus, systems, computing devices, computing entities, and/or the like.

In accordance with one aspect, a method is provided. In one embodiment, the method comprises (1) for an address that generated an exception from the application of one or more exceptions rules, determining whether a confidence level associated with the address satisfies a configurable threshold; and (2) responsive to determining that the confidence level associated with the address satisfies the configurable threshold, overriding the exception for the address and indicating that the item is to be picked up from or delivered to the address.

In accordance with another aspect, a computer program product is provided. The computer program product may comprise at least one computer-readable storage medium having computer-readable program code portions stored therein, the computer-readable program code portions comprising executable portions configured to (1) for an address that generated an exception from the application of one or more exceptions rules, determine whether a confidence level associated with the address satisfies a configurable threshold; and (2) responsive to determining that the confidence level associated with the address satisfies the configurable threshold, override the exception for the address and indicate that the item is to be picked up from or delivered to the address.

In accordance with yet another aspect, an apparatus comprising at least one processor and at least one memory including computer program code is provided. In one embodiment, the at least one memory and the computer program code may be configured to, with the processor, cause the apparatus to (1) for an address that generated an exception from the application of one or more exceptions rules, determine whether a confidence level associated with the address satisfies a configurable threshold; and (2) responsive to determining that the confidence level associated with the address satisfies the configurable threshold, override the exception for the address and indicate that the item is to be picked up from or delivered to the address.

In accordance with one aspect, a method is provided. In one embodiment, the method comprises (1) for a first address that generated an exception from the application of one or more exceptions rules, determining whether an automatic prediction to a second address for the first address has been successfully made, wherein (a) an item is to be picked up from or delivered to the first address and (b) the automatic prediction to the second address for the first address being successful is based at least in part on a visit to the second address; and (2) responsive to determining that an automatic prediction to the second address for the first address has been successfully made, indicating that the item is to be picked up from or delivered to the second address instead of the first address.

In accordance with another aspect, a computer program product is provided. The computer program product may comprise at least one computer-readable storage medium having computer-readable program code portions stored therein, the computer-readable program code portions comprising executable portions configured to (1) for a first address that generated an exception from the application of one or more exceptions rules, determine whether an automatic prediction to a second address for the first address has been successfully made, wherein (a) an item is to be picked up from or delivered to the first address and (b) the automatic prediction to the second address for the first address being successful is based at least in part on a visit to the second address; and (2) responsive to determining that an automatic prediction to the second address for the first address has been successfully made, indicate that the item is to be picked up from or delivered to the second address instead of the first address.

In accordance with yet another aspect, an apparatus comprising at least one processor and at least one memory including computer program code is provided. In one embodiment, the at least one memory and the computer program code may be configured to, with the processor, cause the apparatus to (1) for a first address that generated an exception from the application of one or more exceptions rules, determine whether an automatic prediction to a second address for the first address has been successfully made, wherein (a) an item is to be picked up from or delivered to the first address and (b) the automatic prediction to the second address for the first address being successful is based at least in part on a visit to the second address; and (2) responsive to determining that an automatic prediction to the second address for the first address has been successfully made, indicate that the item is to be picked up from or delivered to the second address instead of the first address.

In accordance with one aspect, a method is provided. In one embodiment, the method comprises (1) for an address that generated an exception from the application of one or more exceptions rules indicating the absence of secondary address information, automatically determining whether one or more previous visits to the address have occurred without the secondary address information, wherein an item is to be picked up from or delivered to the address; and (2) responsive to determining that one or more previous visits to the address have occurred without the secondary address information, indicating that the item is to be picked up from or delivered to the address without the secondary address information.

In accordance with another aspect, a computer program product is provided. The computer program product may comprise at least one computer-readable storage medium having computer-readable program code portions stored therein, the computer-readable program code portions comprising executable portions configured to (1) for an address that generated an exception from the application of one or more exceptions rules indicating the absence of secondary address information, automatically determine whether one or more previous visits to the address have occurred without the secondary address information, wherein an item is to be picked up from or delivered to the address; and (2) responsive to determining that one or more previous visits to the address have occurred without the secondary address information, indicate that the item is to be picked up from or delivered to the address without the secondary address information.

In accordance with yet another aspect, an apparatus comprising at least one processor and at least one memory including computer program code is provided. In one embodiment, the at least one memory and the computer program code may be configured to, with the processor, cause the apparatus to (1) for an address that generated an exception from the application of one or more exceptions rules indicating the absence of secondary address information, automatically determine whether one or more previous visits to the address have occurred without the secondary address information, wherein an item is to be picked up from or delivered to the address; and (2) responsive to determining that one or more previous visits to the address have occurred without the secondary address information, indicate that the item is to be picked up from or delivered to the address without the secondary address information.

In accordance with one aspect, a method is provided. In one embodiment, the method comprises (1) receiving an address associated with a customer; (2) responsive to receiving the address associated with the customer, applying one or more exception rules to determine whether an exception applies to the address; (3) determining that an exception applies to the address based at least in part on the application of the one or more exception rules; and (4) responsive to determining that the exception applies to the address, predicting one or more elements for the address.

In accordance with another aspect, a computer program product is provided. The computer program product may comprise at least one computer-readable storage medium having computer-readable program code portions stored therein, the computer-readable program code portions comprising executable portions configured to (1) receive an address associated with a customer; (2) responsive to receiving the address associated with the customer, apply one or more exception rules to determine whether an exception applies to the address; (3) determine that an exception applies to the address based at least in part on the application of the one or more exception rules; and (4) responsive to determining that the exception applies to the address, predict one or more elements for the address.

In accordance with yet another aspect, an apparatus comprising at least one processor and at least one memory including computer program code is provided. In one embodiment, the at least one memory and the computer program code may be configured to, with the processor, cause the apparatus to (1) receive an address associated with a customer; (2) responsive to receiving the address associated with the customer, apply one or more exception rules to determine whether an exception applies to the address; (3) determine that an exception applies to the address based at least in part on the application of the one or more exception rules; and (4) responsive to determining that the exception applies to the address, predict one or more elements for the address.

BRIEF DESCRIPTION OF THE SEVERAL VIEWS OF THE DRAWING(S)

FIGS. 5-9 represent exemplary input and output produced in accordance with various embodiments of the present invention.

DETAILED DESCRIPTION

Figure 1:
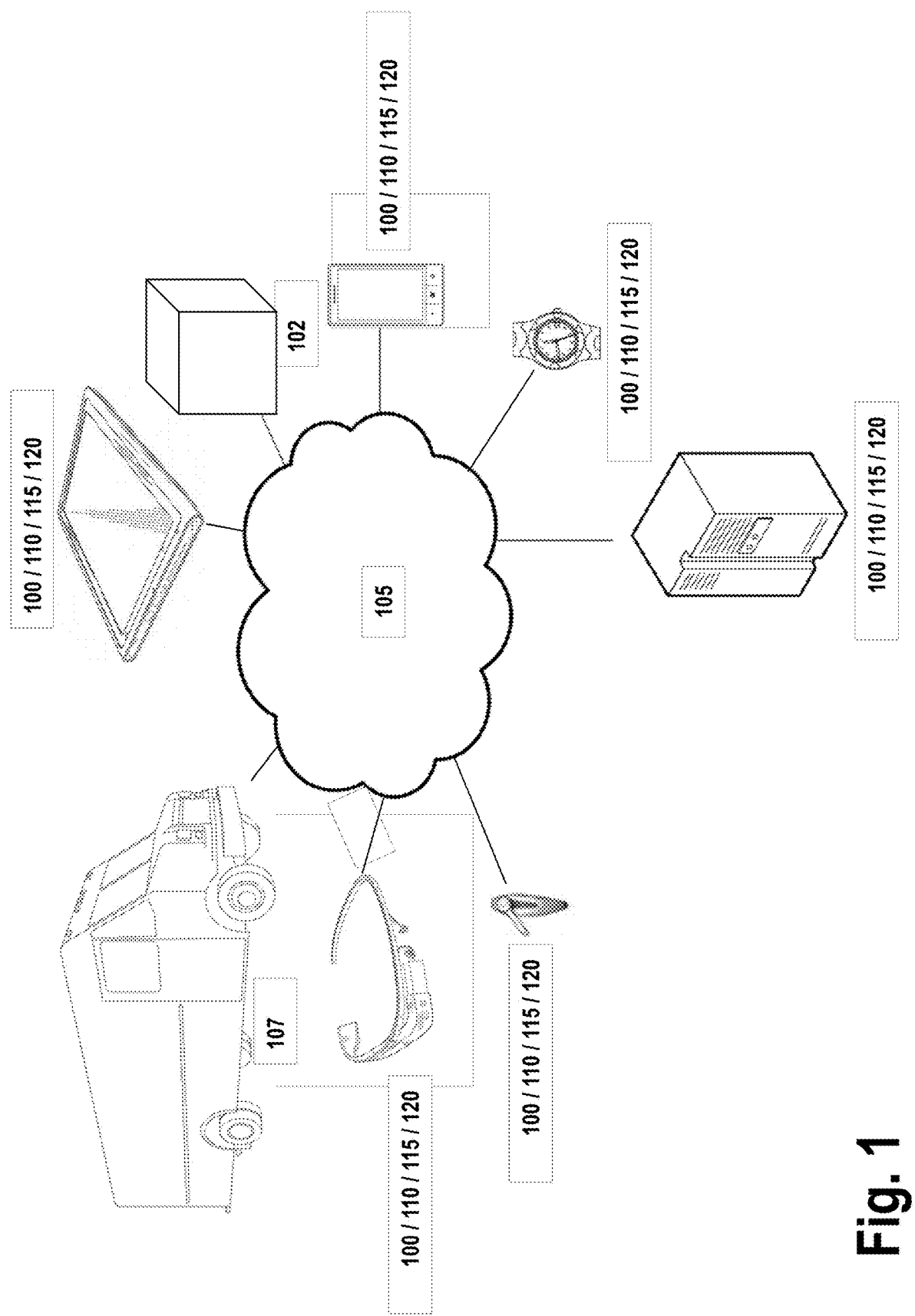
FIG. 1 is an overview of a system that can be used to practice embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1 provides an illustration of an exemplary embodiment of the present invention. As shown in FIG. 1, this particular embodiment may include one or more carrier/transporter computing entities 100, one or more items 102, one or more networks 105, one or more vehicles 107, one or more user computing entities 110, one or more payment computing entities 115, one or more external information/data source computing entities 120, one or more retailer computing entities 125, one or more mobile computing entities, and/or the like. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Carrier/Transporter Computing Entities

Figure 2:
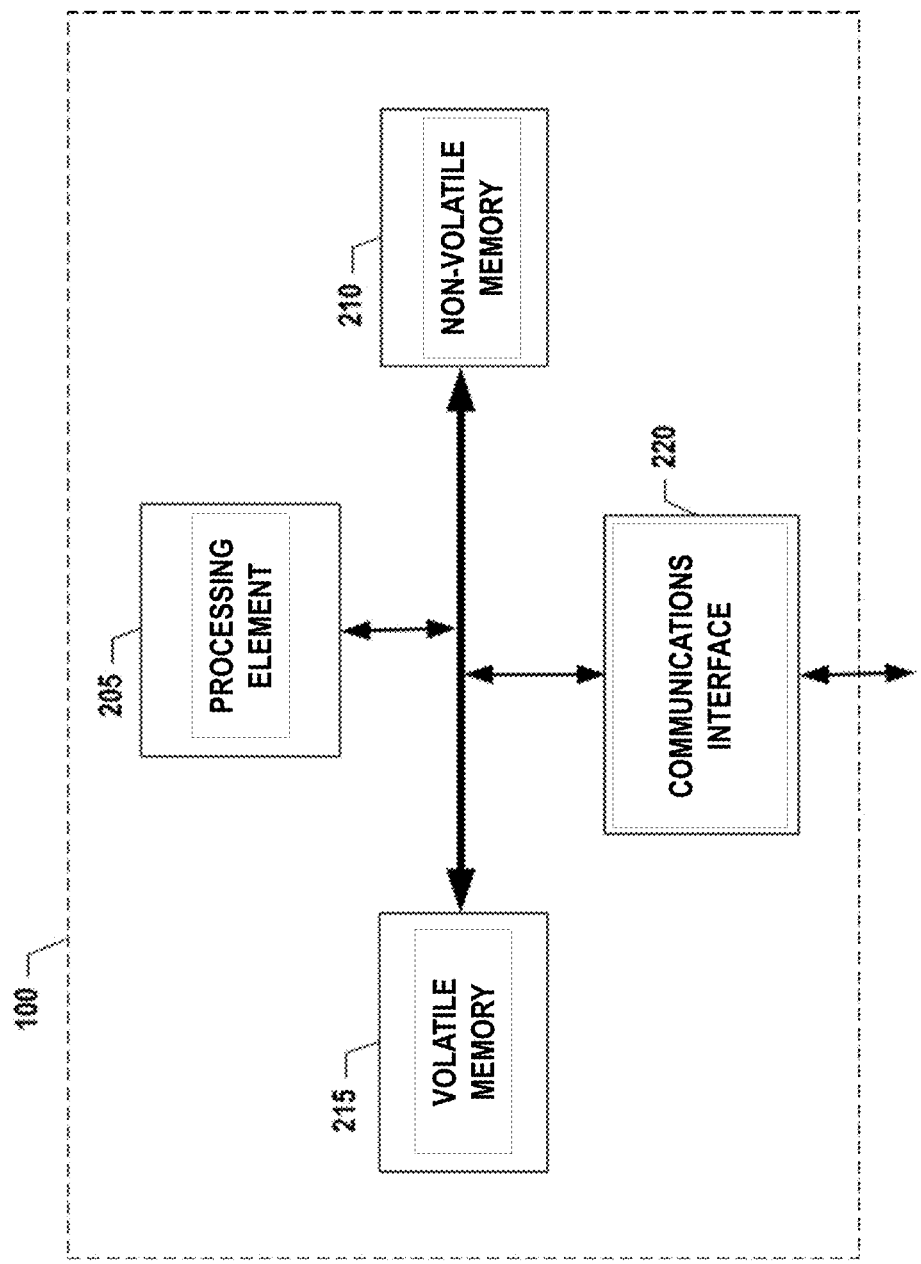
FIG. 2 is an exemplary schematic diagram of a carrier/transporter computing entity according to one embodiment of the present invention.

FIG. 2 provides a schematic of a carrier/transporter computing entity 100 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, iBeacons, proximity beacons, glasses, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining/identifying, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the carrier/transporter computing entity 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the carrier/transporter computing entity 100 may include or be in communication with one or more processing elements 205 (also referred to as processors, processing circuitry, and/or similar terms used herein interchangeably) that communicate with other elements within the carrier/transporter computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the carrier/transporter computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., address cleansing database, address formatting database, item/shipment database, historical item/shipment database, and/or the like), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In one embodiment, the carrier/transporter computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the carrier/transporter computing entity 100 with the assistance of the processing element 205 and operating system. For example, the carrier/transporter computing entity 100 may comprise a learning platform/module.

As indicated, in one embodiment, the carrier/transporter computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the carrier/transporter computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the carrier/transporter computing entity 100 may include or be in communication with one or more input elements, such as a keyboard input, a mouse input, a touch screen/display input, motion input, movement input, audio input, pointing device input, joystick input, keypad input, and/or the like. The carrier/transporter computing entity 100 may also include or be in communication with one or more output elements (not shown), such as audio output, video output, screen/display output, motion output, movement output, and/or the like.

As will be appreciated, one or more of the carrier/transporter computing entity's 100 components may be located remotely from other carrier/transporter computing entity 100 components, such as in a distributed system. Furthermore, one or more of the components may be combined and additional components performing functions described herein may be included in the carrier/transporter computing entity 100. Thus, the carrier/transporter computing entity 100 can be adapted to accommodate a variety of needs and circumstances. As will be recognized, these architectures and descriptions are provided for exemplary purposes only and are not limiting to the various embodiments.

2. Exemplary Vehicle

In various embodiments, the term vehicle 107 is used generically. For example, a carrier/transporter vehicle 107 may be a manned or an unmanned tractor, a truck, a car, a motorcycle, a moped, a Segway, a bicycle, a golf cart, a hand truck, a cart, a trailer, a tractor and trailer combination, a van, a flatbed truck, a vehicle, a drone, an airplane, a helicopter, a boat, a barge, and/or any other form of object for moving or transporting people and/or items (e.g., one or more packages, parcels, bags, containers, loads, crates, items banded together, vehicle parts, pallets, drums, the like, and/or similar words used herein interchangeably). In one embodiment, each vehicle 107 may be associated with a unique vehicle identifier (such as a vehicle ID) that uniquely identifies the vehicle 107. The unique vehicle ID (e.g., trailer ID, tractor ID, vehicle ID, and/or the like) may include characters, such as numbers, letters, symbols, and/or the like. For example, an alphanumeric vehicle ID (e.g., "AS") may be associated with each vehicle 107. In another embodiment, the unique vehicle ID may be the license plate, registration number, or other identifying information assigned to the vehicle 107.

Various computing entities, devices, and/or similar words used herein interchangeably can be associated with the vehicle 107, such as a data collection device or other computing entities. In general, the terms computing entity, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. The data collection device may collect telematics data (including location data) and transmit/send the data to the mobile computing entity, the mapping computing entity, and/or various other computing entities via one of several communication methods.

In one embodiment, the data collection device may include, be associated with, or be in wired or wireless communication with one or more processors (various exemplary processors are described in greater detail below), one or more location-determining devices or one or more location sensors (e.g., Global Navigation Satellite System (GNSS) sensors), one or more telematics sensors, one or more real-time clocks, a J-Bus protocol architecture, one or more electronic control modules (ECM), one or more communication ports for receiving telematics data from various sensors (e.g., via a CAN-bus), one or more communication ports for transmitting/sending data, one or more RFID tags/sensors, one or more power sources, one or more data radios for communication with a variety of communication networks, one or more memory modules 410, and one or more programmable logic controllers (PLC). It should be noted that many of these components may be located in the vehicle 107 but external to the data collection device.

In one embodiment, the one or more location sensors, modules, or similar words used herein interchangeably may be one of several components in wired or wireless communication with or available to the data collection device. Moreover, the one or more location sensors may be compatible with GPS satellites, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, triangulation may be used in connection with a device associated with a particular vehicle 107 and/or the vehicle's operator and with various communication points (e.g., cellular towers or Wi-Fi access points) positioned at various locations throughout a geographic area to monitor the location of the vehicle 107 and/or its operator. The one or more location sensors may be used to receive latitude, longitude, altitude, heading or direction, geocode, course, position, time, and/or speed data (e.g., referred to herein as telematics data and further described herein below). The one or more location sensors may also communicate with the mapping computing entity, the data collection device, mobile computing entity, and/or similar computing entities.

As indicated, in addition to the one or more location sensors, the data collection device may include and/or be associated with one or more telematics sensors, modules, and/or similar words used herein interchangeably. For example, the telematics sensors may include vehicle sensors, such as engine, fuel, odometer, hubometer, tire pressure, location, weight, emissions, door, and speed sensors. The telematics data may include, but is not limited to, speed data, emissions data, RPM data, tire pressure data, oil pressure data, seat belt usage data, distance data, fuel data, idle data, and/or the like (e.g., referred to herein as telematics data). The telematics sensors may include environmental sensors, such as air quality sensors, temperature sensors, and/or the like. Thus, the telematics data may also include carbon monoxide (CO), nitrogen oxides (NOx), sulfur oxides (SOx), Ethylene Oxide (EtO), ozone ($O_3$), hydrogen sulfide ($H_2S$) and/or ammonium ($NH_4$) data, and/or meteorological data (e.g., referred to herein as telematics data).

In one embodiment, the ECM may be one of several components in communication with and/or available to the data collection device. The ECM, which may be a scalable and subservient device to the data collection device, may have data processing capability to decode and store analog and digital inputs from vehicle systems and sensors. The ECM may further have data processing capability to collect and present telematics data to the J-Bus (which may allow transmission to the data collection device), and output standard vehicle diagnostic codes when received from a vehicle's J-Bus-compatible on-board controllers 440 and/or sensors.

As indicated, a communication port may be one of several components available in the data collection device (or be in or as a separate computing entity). Embodiments of the communication port may include an Infrared data Association (IrDA) communication port, a data radio, and/or a serial port. The communication port may receive instructions for the data collection device. These instructions may be specific to the vehicle 107 in which the data collection device is installed, specific to the geographic area in which the vehicle 107 will be traveling, specific to the function the vehicle 107 serves within a fleet, and/or the like. In one embodiment, the data radio may be configured to communicate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth, USB, Wibree, HomeRF, SWAP, and/or the like. Similarly, the customer computing entity 110 may operate in accordance with multiple wired communication standards and protocols, such as those described above with regard to the carrier/transporter computing entity 100 via a network interface 320.

3. Exemplary Item

An item/shipment 102 may be any tangible and/or physical object. Such items/shipments 102 may be picked up and/or delivered by a carrier/transporter. In one embodiment, an item/shipment 102 may be or be enclosed in one or more packages, parcels, bags, containers, loads, crates, items banded together, vehicle parts, pallets, drums, the like, and/or similar words used herein interchangeably. Such items 102 may include the ability to communicate (e.g., via a chip (e.g., an integrated circuit chip), RFID, NFC, Bluetooth, Wi-Fi, and any other suitable communication techniques, standards, or protocols) with one another and/or communicate with various computing entities for a variety of purposes. Further, such items 102 may have the capabilities and components of the described with regard to the carrier/transporter computing entities 100, the items 102, the networks 105, the vehicles 107, the user computing entities 110, the payment computing entities 115, the external information/data source computing entities 120, the retailer computing entities 125, mobile computing entities, and/or the like. In this regard, in some example embodiments, an item may communicate send "to" address information/data, received "from" address information/data, unique identifier codes, and/or various other information/data. In one embodiment, each item may include an item/shipment identifier, such as an alphanumeric identifier. Such item/shipment identifiers may be represented as text, barcodes, tags, character strings, Aztec Codes, MaxiCodes, Data Matrices, Quick Response (QR) Codes, electronic representations, and/or the like. A unique item/shipment identifier (e.g., 123456789) may be used by the carrier to identify and track the item as it moves through the carrier's transportation network. Further, such item/shipment identifiers can be affixed to items by, for example, using a sticker (e.g., label) with the unique item/shipment identifier printed thereon (in human and/or machine readable form) or an RFID tag with the unique item/shipment identifier stored therein.

4. Exemplary User Computing Entities

Figure 3:
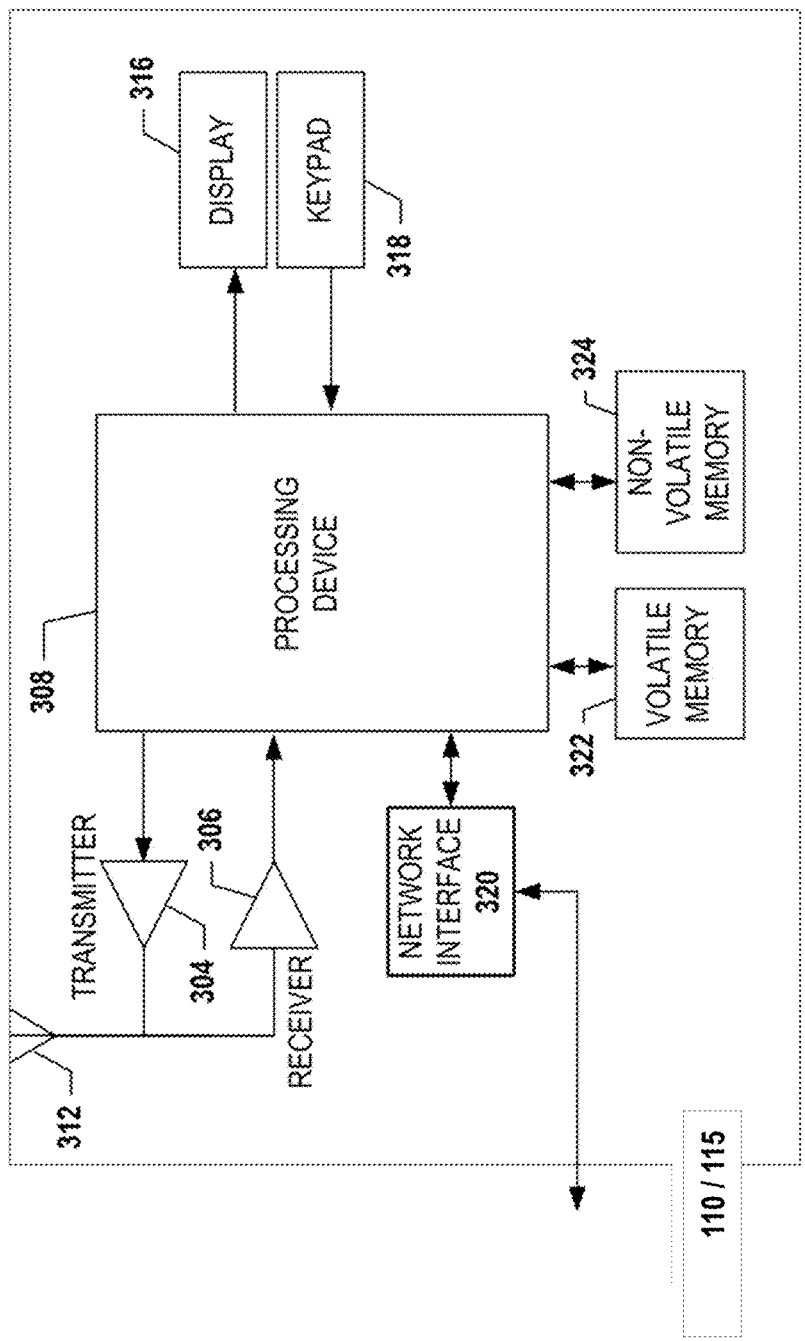
FIG. 3 is an exemplary schematic diagram of a user computing entity according to one embodiment of the present invention.

A user may be an individual, a family, a company, an organization, an entity, a department within an organization, a representative of an organization and/or person, and/or the like—whether or not associated with a carrier/transporter. A user may be a consignor, consignee, carrier/transporter operator/personnel, and/or the like. Thus, the terms user, customer, consignee, consignor, carrier/transporter operator/personnel, and or similar terms may be used herein interchangeably. A user computing entity 110 may include one or more components that are functionally similar to those of the carrier/transporter computing entity 100. FIG. 3 provides an illustrative schematic representative of a user computing entity 110 that can be used in conjunction with embodiments of the present invention. In general, the terms device, system, computing entity, entity, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties, including carrier/transporter operator/personnel (sorters, loaders, delivery drivers, network administrators, and/or the like). As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the carrier/transporter computing entity 100. In a particular embodiment, the user computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the carrier/transporter computing entity 100 via a network interface 320.

Via these communication standards and protocols, the user computing entity 110 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include location determining/identifying aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using GPS). The satellites may be a variety of different satellites, including LEO satellite systems, DOD satellite systems, the European Union Galileo positioning systems, the Chinese Compass navigation systems, Indian Regional Navigational satellite systems, and/or the like. This information/data can be collected using a variety of coordinate systems, such as the DD; DMS; UTM; UPS coordinate systems; and/or the like. Alternatively, the location information can be determined by triangulating the user computing entity's 110 position in connection with a variety of other systems, including cellular towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 110 may also comprise a user interface (that can include a display 316 coupled to a processing element 308) and/or a user input interface (coupled to a processing element 308). For example, the user interface may be a user application, browser, user interface, interface, and/or similar words used herein interchangeably executing on and/or accessible via the user computing entity 110 to interact with and/or cause display of information from the carrier/transporter computing entity 100, as described herein. The user input interface can comprise any of a number of devices or interfaces allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the carrier/transporter computing entity 100 and/or various other computing entities.

In another embodiment, the user computing entity 110 may include one or more components or functionality that are the same or similar to those of the carrier/transporter computing entity 100, as described in greater detail above. As will be recognized, these architectures and descriptions are provided for exemplary purposes only and are not limiting to the various embodiments.

5. Exemplary Payment Computing Entities

In one embodiment, a payment computing entity 115 may include one or more components that are functionally similar to those of the carrier/transporter computing entity 100, the user computing entity 110, the external information/data source computing entity 120, the retailer computing entity 125, and/or the like. For example, in one embodiment, each payment computing entity 115 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, the user interface may be a user application, browser, user interface, interface, and/or similar words used herein interchangeably executing on and/or accessible via the payment computing entity 115 to interact with and/or cause display of information from various other entities. As will be recognized, these architectures and descriptions are provided for exemplary purposes only and are not limiting to the various embodiments.

Payments may be in a variety of forms, such as via debit cards, credit cards, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like. Such payments may be made using a variety of techniques and approaches, including through NFC technologies such as PayPass, Android Beam, Bluetooth low energy (BLE), and various other contactless payment systems. Further, such payment technologies may include PayPal Beacon, Booker, Erply, Leaf, Apple Pay, Leapset, Micros, PayPal Here, Revel, ShopKeep, TouchBistro, Vend, and/or the like.

6. Exemplary External Information/Data Source Computing Entities

In one embodiment, various entities may operate external information/data source computing entities 120. For example, external information/data source computing entities 120 may store or have access to property records, tax records, phone number directories, criminal records, address databases, credit records (e.g., Experian, Dun & Bradstreet (D&B), Equifax, Trans Union, and/or the like), bank deed records, government records (including postal records), medical records, purchasing records (e.g., credit card records), product registration records, birth records, and/or the like. An external information/data source computing entity may include one or more components that are functionally similar to those of the carrier/transporter computing entity 100, the user computing entity 110, the payment computing entity 115, retailer computing entity 125, and/or the like. For example, in one embodiment, each external information/data source computing entity 120 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, the user interface may be a user application, browser, user interface, interface, and/or similar words used herein interchangeably executing on and/or accessible via the external information/data source computing entity 120 to interact with and/or cause display of information from various other entities. As will be recognized, these architectures and descriptions are provided for exemplary purposes only and are not limiting to the various embodiments.

7. Exemplary Retailer Computing Entity

In one embodiment, a retailer computing entity 125 may include one or more components that are functionally similar to those of the carrier/transporter computing entity 100, the user computing entity 110, the payment computing entity 115, the external information/data source computing entity 120, and/or the like. A retailer may provide retail services, such as amazon.com, macys.com, dell.com, walmart.com, apple.com, staples.com, amazon.com, bestbuy.com, costco.com, alibaba.com, ebay.com, netflix.com, sears.com, AppleTV, Apple, Dish, Amazon Digital Services, AT&T U-verse, DIRECT TV, Google Play, QVC, Xbox, Xbox 360, Xbox One, Wii, Wii U, PlayStation, PlayStation 2, PlayStation, PlayStation 3, PlayStation 4, 3DO, GameCube, Genesis, Intellivision, Nintendo 64, and/or the like. In one embodiment, each retailer computing entity 125 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, the user interface may be a user application, browser, user interface, and/or similar words used herein interchangeably executing on and/or accessible via the retailer computing entity 125 to interact with and/or cause display of information from various other entities. As will be recognized, these architectures and descriptions are provided for exemplary purposes only and are not limiting to the various embodiments.

III. EXEMPLARY SYSTEM OPERATION

Figure 4:
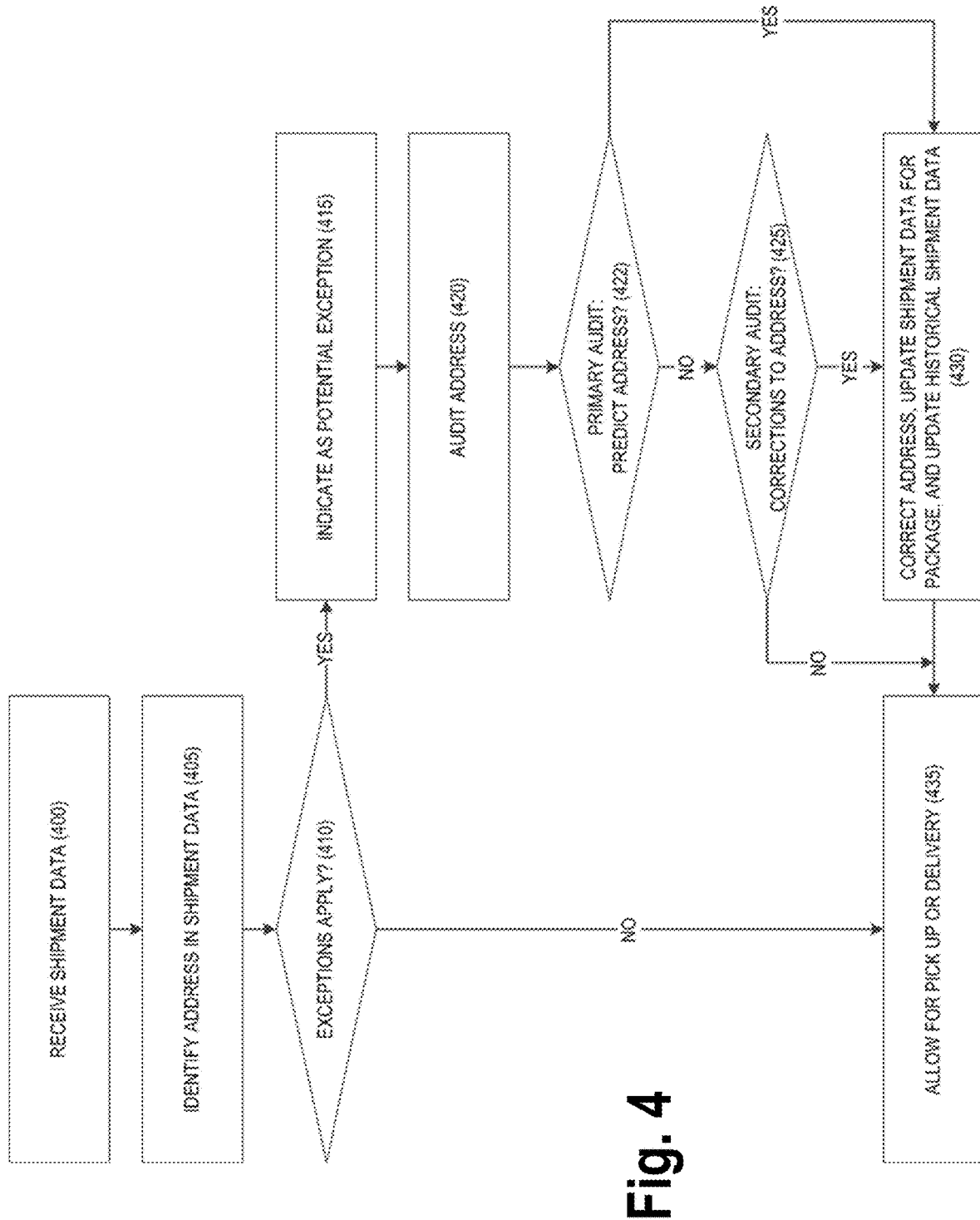
FIG. 4 is a flowchart illustrating operations and processes that can be used in accordance with various embodiments of the present invention.

Reference will now be made to FIGS. 4-9. FIG. 4 is a flowchart illustrating operations and processes that may be performed for address correction and prediction. And FIGS. 6-9 represent exemplary input and output produced in accordance with various embodiments of the present invention.

1. Receiving Information/Data

In one embodiment, the process may begin by receiving information/data. In one embodiment, the information/data received can comprise address information/data and or name information/data, such as address information/data from a retailer, carrier/transporter, and/or the like (e.g., third party) wishing to validate the address information/data. In another embodiment, the information/data may be item/shipment information/data associated with one or more items/shipments 102 to be transported by a carrier/transporter through the carrier's transportation and logistics network (Block 400 of FIG. 4). In the e-commerce context, receiving item/shipment information/data can occur at any point of an e-commerce transaction—before, during, after, or as part of the checkout process; after an item is purchased; upon tender of the item/shipment 102 to the carrier/transporter; at one or more scan or inspection points in the carrier's transportation and logistics network; and/or the like. In other contexts, receiving the item/shipment information/data can occur upon the generation/creation of a label for an item/shipment 102, upon tender of the item/shipment 102 to the carrier/transporter, at one or more scan or inspection points in the carrier's transportation and logistics network, and/or the like. For example, the carrier/transporter computing entity 100 can receive item/shipment information/data as part of a request to pick up one or more items/shipments from a consignor and/or to delivery one or more items to a consignee. As will be recognized, a variety of other approaches and techniques can be used to adapt to various needs and circumstances.

In one embodiment, a carrier/transporter may be a traditional carrier/transporter, such as United Parcel Service of America (UPS), FedEx, DHL, courier services, the United States Postal Service (USPS), Canadian Post, freight companies (e.g. truck-load, less-than-truckload, rail carriers, air carriers, ocean carriers, etc.), and/or the like. However, a carrier/transporter may also be a nontraditional carrier/transporter, such as Amazon, Google, Uber, ride-sharing services, crowd-sourcing services, retailers, and/or the like.

As will be described in further detail below, information/data may be item/shipment information/data and comprise various other types of information/data: input information/data, intermediate information/data, pick-up information/data, delivery information/data, exception information/data, tracking information/data, item-level information/data, consignor information/data, consignee information/data, name information/data, address information/data (including primary address information/data and secondary address information/data), billing information/data, and/or similar words used herein interchangeably. In one embodiment, this information/data may comprise details about the item/shipment 102 itself, such as the length, width, base, radius, height, cube/volume (e.g., cubic feet, cubic centimeters, etc.), and/or weight (e.g., pounds, grams, etc.). The information/data may also include information/data about the type of or contents of the item/shipment 102, such as being of a special handling category. Such information/data may be obtained from a scan or other inspection of the item/shipment 102, including the scanning of a unique item/shipment identifier on the item/shipment 102 which refers to additional information/data about the item/shipment 102. Similarly, the information/data may be captured when the item/shipment 102 is first received by the carrier/transporter (e.g., receiving an item for ingestion into the transportation and logistics network), from a user generating a label or unique identifier, automatic detection using various systems, manually input information/data, and/or the like.

In one embodiment, the information/data may comprise details about the service level. Exemplary services levels may include Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like. As will be recognized, various other services levels are contemplated within embodiments of the present invention.

In one embodiment, the information/data may include address information/data, consignor information/data, consignee information/data, and/or name information/data. The address information/data may comprise the address of the consignor and/or consignee that can be parsed by an appropriate computing entity (e.g., carrier/transporter computing entity 100, user computing entity 110, payment computing entity 115, external information/data source computing entity 120, and/or the like). The address information/data may include various elements: a number, a number fractional, a pre-directional, a pre-qualifier, a pre-type, a pre-article, a name, a post-article, a suffix, a post-qualifier, a post directional, a locker number, a suit type, a suite number, a city, a state, a province, a country, a region, a zip code, a postal code, a post office box type, a post office box number, a geocode, a longitude and a latitude, and/or the like. The consignee information/data, consignor information/data, and/or name information/data for a person may include various elements: a title, a given name, a surname, a suffix, a nickname, and/or the like. The consignee information/data, consignor information/data, and/or name information/data for an entity may include an entity name, entity designation, and/or the like.

Further, in one embodiment, the address information/data and/or each element of the address information/data can be associated with a confidence level. For example, the address information/data shown in FIG. 6 is associated with a 91 out of 100 confidence level indicating that the address information/data is believed to be 91% accurate. Similarly, the name information/data and/or each element of the name information/data can be associated with a confidence level. For example, the address information/data shown in FIG. 7 is associated with a 91 out of 100 confidence level, and the name information/data is associated with a 97 out of 100 confidence level. As also shown in FIG. 7, this may result in determining/identifying a combined confidence level of 94 out of 100 for the address information/data and name information/data—which, in this example, is the average of the overall confidence level for the address information/data and of the overall confidence level for the name information/data. In addition to the confidence levels of FIG. 7, FIG. 8 further shows confidence levels for each populated name element and each populated address element. In example of FIG. 8, the overall confidence levels are the average of each of the populated element confidence levels. As will be recognized, a variety of other approaches and techniques can be used to adapt to various needs and circumstances. For example, any of a variety of indicators and scales can be used as a confidence level.

The information/data may also include tracking information/data (of various "tracking events") corresponding to the location of the item/shipment 102 in the transportation and logistics network as indicated by the tracking events, including one or more origin entity and destination entity pairs. To reflect the item's movement, an item/shipment identifier associated with the item/shipment 102 may, for example, be scanned or otherwise electronically read at various points as the item/shipment 102 is transported through the carrier's transportation and logistics network. As indicated, these events may be referred to as tracking events. For the tracking events, an item/shipment identifier may be automatically scanned by a barcode or MaxiCode device, an RFID interrogator, a camera controller, a carrier/transporter employee using a user computing entity 110, and/or the like. In one embodiment, each time an item/shipment identifier is scanned or read, an appropriate device/entity can generate/create information/data associated with the tracking event and transmit the appropriate information/data (e.g., item/shipment identifier, location and time of the scan or reading, event type, bundle/container, and/or the like) to the carrier/transporter computing entity 100 for storage in the item/shipment database. That is, during the item's transit from an origin to a delivery location, intermediate information/data and other information/data from tracking events may be obtained at various waypoints for storage.

In one embodiment, the tracking information/data may include exception information/data and/or delivery information/data. For instance, if there is a problem or exception to the normal handling procedures for an item/shipment 102, exception information/data may be obtained and stored. Exceptions may indicate when, where, and/or why a particular item/shipment 102 might not allow for pick-up or delivery (e.g., incorrect primary address information/data, missing secondary information/data, consignee/consignor moved, and/or the like)—flagging the address or item/shipment for further investigation/auditing. Delivery information/data may include information/data obtained about an item/shipment 102 when it is delivered to the consignee, locker, delivery location, and/or the like. For example, a delivery scan may be accomplished by the person or driver (e.g., carrier/transporter operator/personnel) making the delivery via a user computing entity 110 to record delivery information/data, such as the date, time, location, consignee identity, consignee signature, delivery location, and other information/data related to the delivery. As will be recognized, a variety of other approaches and techniques can be used to adapt to various needs and circumstances.

2. Collecting Historical Item/Shipment Information/Data

Historical item/shipment information/data may be collected in a variety of ways. For example, carrier/transporter operator/personnel for the carrier/transporter can visit delivery locations (e.g., consignee locations) to deliver items/shipments 102 that have been transported through the carrier's transportation and logistics network. For instance, upon arriving at a delivery location (e.g., locker, delivery address, and/or the like) for an item/shipment 102 to a consignee, carrier/transporter operator/personnel can access item/shipment information/data for the item/shipment 102 that includes the consignee's name and delivery location (e.g., delivery address)—Mr. John Doe at 123 Main Street, Apartment 1A, Any Town, Georgia 30328. The carrier/transporter operator/personnel can access the item/shipment information/data for the item/shipment 102 via a user computing entity 110. The corresponding item/shipment information/data can be displayed by the user computing entity 110 for viewing by carrier/transporter operator/personnel.

In the event an item/shipment 102 is successfully picked up or delivered, carrier/transporter operator/personnel can input a corresponding entry (e.g., via a user computing entity 110) indicating when, where, and/or from or to whom the item/shipment 102 was picked up or delivered (along with various other information/data regarding the pick-up or delivery). This information/data can be stored by the historical item/shipment database indicating that an item/shipment 102 was picked up from or delivered to the listed consignor/consignee at the designated address. The entry can also include what, when, where, and/or from or to whom the item/shipment 102 was picked up or delivered (along with various other information/data regarding the pick-up or delivery). The historical item/shipment database can store entries/records for each pick-up and/or delivery by the carrier. By storing such entries/records, the historical item/shipment database can include historical information/data for items/shipments 102 that were successfully picked up from and/or delivered to any number of addresses, consignees, consignors, and/or the like. Using this information/data, the carrier/transporter computing entity 100 can determine/identify the number of successful or unsuccessful pick-ups or deliveries that have occurred at a given address (along with various other information/data regarding the pick-up or delivery). Further, the carrier/transporter computing entity 100 can regularly, periodically, continuously, and or in response to certain triggers update or associate (e.g., determine/identify) one or more confidence levels with the corresponding address information/data and/or name information/data (e.g., via the learning platform/module). For instance, the confidence levels determined/identified by the carrier/transporter computing entity 100 may increase with successful pick-ups or deliveries by the carrier/transporter. As will be recognized, a variety of other approaches and techniques can be used to adapt to various needs and circumstances.

In the event an item/shipment 102 is successfully picked up or delivered but not based on the provided item/shipment information/data, carrier/transporter operator/personnel can correct/update the item/shipment information/data. For instance, carrier/transporter operator/personnel (e.g., operating a user computing entity 110) can input the corrected/updated name or address information/data. For example, if carrier/transporter operator/personnel attempted to deliver an item/shipment 102 to John Doe at 122 Main Street, Any Town, Georgia 30328, but the carrier/transporter operator/personnel knew that John Doe actually lives at 123 Main Street, Apartment 1A, Any Town, Georgia 30328, and made the delivery accordingly, he/she (e.g., operating a user computing entity 110) would input the address to which the item/shipment 102 was actually delivered. The carrier/transporter computing entity 100 can then receive and use the information/data to track the item/shipment 102 as it is transported though the carrier's transportation and logistics network and update the item/shipment information/data accordingly. The carrier/transporter computing entity 100 can also save the information/data in a historical item/shipment database and/or an exception database. As previously described, the carrier/transporter computing entity 100 can update or associate (e.g., determine/identify) one or more confidence levels with the corresponding address information/data and/or name information/data (e.g., via the learning platform/module).

Similarly, in the event an item/shipment 102 is not successfully picked up or delivered, carrier/transporter operator/personnel can input a corresponding entry (e.g., via a user computing entity 110) indicating when, where, and/or why the item/shipment 102 was not successfully picked up or delivered (e.g., incorrect primary address information/data, missing secondary address information/data, consignee/consignor moved, and/or the like). This information/data can be stored by the item/shipment database indicating that the item/shipment 102 was not successfully picked up from or delivered to the listed consignor/consignee at the designated address. As indicated, the entry can also include when, where, and/or why the item/shipment 102 was not successfully picked up or delivered. The item/shipment database can store entries/records for each attempted pick-up and/or delivery by the carrier. Further, the carrier/transporter computing entity 100 can regularly, periodically, continuously, and or in response to certain triggers update or associate (e.g., determine/identify) one or more confidence levels with the corresponding address information/data and/or name information/data (e.g., via the learning platform/module). For instance, the confidence levels determined/identified by the carrier/transporter computing entity 100 may decrease with unsuccessful pick-ups or deliveries by the carrier/transporter. As will be recognized, a variety of other approaches and techniques can be used to adapt to various needs and circumstances.

3. Address Information/Data

As indicated, in one embodiment, the process may begin by receiving information/data (Block 400 of FIG. 4). The information/data can comprise item/shipment information/data, address information/data, name information/data, and/or the like. Thus, the carrier/transporter computing entity 100 can determine/identify the address information/data and/or name information/data in the received information/data. Further, the carrier/transporter computing entity 100 can parse the address information/data and/or name information/data to determine/identify the number, the number fractional, the pre-directional, the pre-qualifier, the pre-type, the pre-article, the name, the post-article, the locker number, the suffix, the post-qualifier, the post directional, the locker number, the suit type, the suite number, the city, the state, the province, the country, the region, the zip code, the postal code, the post office box type, the post office box number, the geocode, the longitude and the latitude, the title, the given name, the surname, the suffix, the nickname, and/or the like (Block 405 of FIG. 4).

In one embodiment, with the parsed address information/data and/or name information/data, the carrier/transporter computing entity 100 can apply one or more exception rules to determine/identify whether any exceptions apply to the address and/or name (Block 410 of FIG. 4). The exception rules can be used to determine/identify whether an address might not allow for pick-up or delivery (e.g., incorrect primary address information/data, missing secondary information/data, consignee/consignor moved, and/or the like)—flagging the address or item/shipment for further investigation/auditing. In one embodiment, the carrier/transporter computing entity 100 can apply one or more exception rules using a variety of techniques and approaches. For instance, the exception rules can be applied in parallel or in sequence. In one embodiment, if applied in sequence and the address information/data is confirmed as being valid/accurate, the remaining exception rules are not necessarily applied to the address information/data. In another embodiment, all of the exception rules can be applied irrespective of the outcome of applying other exception rules. In one embodiment, applying the exception rules may be used to determine/identify whether the address information/data and/or name information/data are incorrect, such as having an incorrect number or street name and matching consignee. Further, applying the exception rules may be used to determine/identify whether any of the address information/data (e.g., secondary address information/data) is missing or incomplete. Still further, applying the exception rules may be used to determine/identify whether the listed consignor for a pick-up or consignee for a delivery has moved. In the following example, the address information/data for the item/shipment 102 indicates that the pick-up or delivery address of the item/shipment 102 is 122 Main Street, Any Town, Georgia 30328, and the consignor/consignee is John Doe.

In one embodiment, each exception rule or set of exception rules can be set to "ON" or "OFF" (e.g., the ON or OFF can be used to indicate whether a rule is set to execute or not). Further, each exception rule or set of exception rules may define a firing order (e.g., execution or processing order). The firing order may define the order or sequence in which the exception rules or sets of exception rules should fire, be applied, be executed, and/or similar words used herein interchangeably. Additionally or alternatively, the exception rules or sets of exception rules can fire, be applied, or be executed simultaneously. Further, the exception rules or sets of exception rules may be conditional. That is, certain exception rules or sets of exception rules may only fire if certain conditions are met. Further, in one embodiment, in addition to applying the exception rules, the carrier/transporter computing entity 100 can update or associate (e.g., determine/identify) one or more confidence levels with the corresponding address information/data and/or name information/data (e.g., via the learning platform/module). For instance, the carrier/transporter computing entity 100 can modify the confidence levels based at least in part on the whether one or more exceptions are generated/created as a result of application of the exception rules (applying, firing, executing the exception rules). As will be recognized, a variety of other approaches and techniques can be used to adapt to various needs and circumstances.

4. Incorrect Address Information/Data Exception Rules

In one embodiment, an appropriate computing entity (applying, firing, executing the exception rules) can generate/create an exception if a pick-up or delivery has not been successfully completed to the address (e.g., pick-up or delivery location) indicated in the address information/data (Block 415 of FIG. 4) or if one or more corresponding confidence levels are below a configurable threshold (e.g., 75%). Generally, generating/creating an exception may indicate that (when, where, and/or why) an address for a particular item/shipment 102 might not allow for pick-up or delivery (e.g., incorrect primary address information/data and/or the like). Thus, generating/creating an exception can flag the address or item/shipment 102 for further investigation/auditing. In one embodiment, to do so, the carrier/transporter computing entity 100 can determine/identify whether the carrier/transporter (or other carriers or entities) has ever picked up an item/shipment 102 from or delivered an item/shipment 102 to the address indicated in the address information/data. This may be based on all or portions of the address information/data, such as only using the number of the street address and/or name of the street. For example, this determination/identification may require an exact match or a substantially similar match (e.g., taking into account match of all or portions of the available address information/data including available numbers, number fractionals, pre-directionals, pre-qualifiers, pre-types, pre-articles, names, post-articles, locker numbers, suffixes, post-qualifiers, post directionals, suit types, suite numbers, cities, states, provinces, countries, regions, zip codes, postal codes, post office box types, post office box numbers, geocodes, longitudes and latitudes, titles, given names, surnames, suffixes, nicknames, and/or the like). To make this determination/identification, the carrier/transporter computing entity 100 can query a historical item/shipment database (with records/entries of successful and unsuccessful pick-ups and deliveries (e.g., visits) for a configurable time period and/or confidence levels) to determine/identify whether any successful pick-ups or deliveries have been completed at 122 Main Street, Any Town, Georgia 30328. In a particular example, this may include determining/identifying whether any successful pick-ups or deliveries have been completed to John Doe at 122 Main Street, Any Town, Georgia 30328—using the consignor's or consignee's name information/data in addition to the address information/data. If no successful pick-ups or deliveries have been completed to 122 Main Street, Any Town, Georgia 30328 (based on the historical item/shipment database), the carrier/transporter computing entity 100 can create/generate an exception for the pick-up or delivery at the address (Block 415 of FIG. 4).

In one embodiment, the carrier/transporter computing entity 100 (applying, firing, executing the exception rules) can generate/create an exception if the address indicated in the address information/data is not determined/identified as being valid/accurate by one or more external information/data source computing entities 120 (Block 415 of FIG. 4). As previously indicated, the external information/data source computing entities 120 may store or have access to property records, tax records, phone number directories, criminal records, address databases, credit records, bank deed records, government records (including postal records), medical records, purchasing records, product registration records, birth records, and/or the like. By storing or having access to such information/data, the carrier/transporter computing entity 100 can request that one or more external information/data source computing entities 120 determine/identify whether the address indicated in the address information/data is valid/accurate. To make this request, the carrier/transporter computing entity 100 can communicate with one or more external information/data source computing entities 120 (e.g., via one or more application programming interfaces (APIs)) and provide the address information/data to one or more external information/data source computing entities 120. In a particular example, the carrier/transporter computing entity 100 can provide 122 Main Street, Any Town, Georgia 30328 (and/or John Doe's name) as the address information/data to one or more external information/data source computing entities 120. Responsive to such requests, the one or more external information/data source computing entities 120 can validate/confirm the address information/data. To validate/confirm the address information/data, the external information/data source computing entities 120 can search property records, tax records, phone number directories, criminal records, address databases, credit records, bank deed records, government records (including postal records), medical records, purchasing records, product registration records, birth records, and/or the like to determine/identify whether the address information/data is valid/accurate (e.g., whether it is an actual address or John Doe's actual address). For instance, an external information/data source computing entity 120 may search a county's tax records for 122 Main Street, Any Town, Georgia 30328 to determine/identify whether it is a valid/accurate address based on the tax records. Similarly, an external information/data source computing entity 120 may search a county's tax records for property owners named John Doe to determine/identify addresses associated with any property owners named John Doe. As will be recognized, a variety of different approaches and techniques can be used to adapt to various needs and circumstances. If one or more of the external information/data source computing entities 120 determine/identify that the address is valid/accurate, the external information/data source computing entities 120 can provide a notification to the carrier/transporter computing entity 100 regarding the same. However, if the one or more external information/data source computing entities 120 determine/identify that the address is not valid/accurate or are unable to determine/identify whether the address is valid/accurate, the external information/data source computing entities 120 can provide a notification to the carrier/transporter computing entity 100 regarding the same. In the event the address is not valid/accurate, the carrier/transporter computing entity 100 can create/generate an exception for the specific address (Block 415 of FIG. 4).

In one embodiment, if no exceptions exist for a given address (e.g., exceptions for a pick-up or delivery), the carrier/transporter computing entity 100 can allow for normal pick-up or delivery of the item/shipment and electronically indicate the same (Block 435 of FIG. 4). In contrast, if an exception exists for a given address (e.g., pick-up or delivery), the carrier/transporter computing entity 100 can initiate one or more audit processes of the address information/data (Block 420 of FIG. 4). As will be recognized, a variety of other approaches and techniques can be used to adapt to various needs and circumstances.

5. Missing Address Information/Data Exception Rules

In one embodiment, an appropriate computing entity (applying, firing, executing the exception rules) can generate/create an exception for addresses missing secondary address information/data) or if one or more corresponding confidence levels are below a configurable threshold (e.g., 63 out of 100). As indicated, generating/creating an exception may indicate that (when, where, and/or why) an address for a particular item/shipment 102 might not allow for pick-up or delivery (e.g., missing secondary information/data and/or the like). Thus, generating/creating an exception can flag the address or item/shipment 102 for further investigation/auditing. For example, if an address for an item/shipment 102 does not have any secondary address information/data (e.g., apartment numbers, suite numbers, and/or the like), the carrier/transporter computing entity 100 (applying, firing, executing the exception rules) can generate/create an exception if a configurable threshold (e.g., number, percentage, character, and/or the like) of successful pick-ups or deliveries to the address (e.g., pick-up or delivery location) have included secondary address information/data (Block 415 of FIG. 4). For any successful pick-ups or deliveries to the address indicated in the address information/data (123 Main Street, Any Town, Georgia 30328), the carrier/transporter computing entity 100 can determine/identify whether the address information/data included secondary address information/data. The secondary address information/data may include as apartment numbers, suite numbers, and/or the like.

To make this determination/identification, the carrier/transporter computing entity 100 can query a historical item/shipment database and/or external data sources (e.g., with records/entries of successful and unsuccessful pick-ups and deliveries (e.g., visits) for a configurable time period and/or confidence levels) to determine/identify whether any successful pick-ups or deliveries have been completed at 123 Main Street, Any Town, Georgia 30328. For any successful pick-ups or deliveries at 123 Main Street, Any Town, Georgia 30328, the carrier/transporter computing entity 100 can determine/identify whether and/or how many of the successful pick-ups or deliveries included secondary address information/data as part of the address information/data. Then, if a configurable threshold (e.g., number, percentage, character, and/or the like) of successful pick-ups or deliveries included secondary address information/data and the address information/data for the pick-up or delivery does not include secondary address information/data, the carrier/transporter computing entity 100 can create/generate an exception for the pick-up or delivery at the address (Block 415 of FIG. 4). In one example, the configurable threshold may be 80% of the successful pick-ups or deliveries with a minimum of five successful pick-ups or deliveries. For instance, the carrier/transporter computing entity 100 can determine/identify whether 80% (e.g., the configurable threshold) of the successful pick-ups or deliveries included secondary address information/data as part of the address information/data and create/generate an exception if the address for a pick-up or delivery does not include secondary address information/data. In another example, the configurable threshold may be seven successful pick-ups or deliveries. As will be recognized, such configurable thresholds (e.g., numbers or percentages) may vary to adapt to different needs and circumstances.

In one embodiment, certain items/shipments 102 may be able to be picked up or delivered without secondary address information/data—even if secondary address information/data is part of the address. For instance, if carrier/transporter operator/personnel picking up or delivering an item/shipment 102 know the location of the consignor or consignee (or the learning platform/module determines/identifies that previous deliveries or pick-ups have been made without the secondary address information/data), the item/shipment 102 may be able to be picked up or delivered regardless of the address indicated in the address information/data. By way of example, assume that John Doe frequently receives items/shipments 102 at 123 Main Street, Apartment 1A, Any Town, Georgia 30328. The frequency may lead to carrier/transporter operator/personnel becoming familiar with Mr. John Doe and knowing where to pick up or deliver his items/shipments 102 and/or the learning platform/module determining/identifying that previous deliveries or pick-ups have been made without the secondary address information/data. In such an example, the configurable threshold for the number of successful pick-ups or deliveries may be satisfied based on the knowledge and experience of carrier/transporter operator/personnel without necessarily being reflected in the historical item/shipment database. The same may hold true for large or well-known businesses or regular customers, such as pick-ups or deliveries to The Home Depot, Amazon Returns, and/or the like. Thus, the knowledge and experience of carrier/transporter operator/personnel (and/or determinations/identifications of the learning module) may overcome inaccurate or incomplete address information/data. The carrier/transporter computing entity 100 can make such determination/identifications based on the identity of the carrier/transporter operator/personnel. For instance, if Worker A successfully made a pick-up or delivery, the carrier/transporter computing entity will not necessarily impute Worker A's knowledge on Work B if Work B covers Worker A's route. In these examples, the successful pick-ups or deliveries may indicate that secondary address information/data is not necessary because of the skill of the carrier/transporter operator/personnel based on the number of successful pick-ups and/or deliveries (e.g., visits) and/or previous successful pick-ups or deliveries as determined/identified by the learning module. Thus, in these cases, the carrier/transporter computing entity 100 may determine/identify that secondary address information/data is not necessary to successfully complete a pick-up or delivery as the historical database might not include secondary address information/data for the successful pick-ups or deliveries.

In one embodiment, if no exceptions exist for a given address (e.g., exceptions for a pick-up or delivery), the carrier/transporter computing entity 100 can allow for normal pick-up or delivery of the item/shipment 102 and electronically indicate the same (Block 435 of FIG. 4). In contrast, if an exception exists for a given address, the carrier/transporter computing entity 100 can initiate one or more audit processes of the address information/data (Block 420 of FIG. 4). As will be recognized, a variety of other approaches and techniques can be used to adapt to various needs and circumstances.

6. Changed Address Information/Data Exception Rules

In one embodiment, an appropriate computing entity (applying, firing, executing the exception rules) can generate/create an exception if name information/data and/or address information/data for a pick-up or delivery is stored as a record or entry in a moved/changed database. As indicated, generating/creating an exception may indicate that (when, where, and/or why) an address for a particular item/shipment 102 might not allow for pick-up or delivery (e.g., consignee/consignor moved and/or the like). Thus, generating/creating an exception can flag the address or item/shipment 102 for further investigation/auditing. For example, a moved/changed database may store or have access to records/entries of customers (consignors/consignees) who have moved within a configurable time period. The configurable time period may be three months, six months, nine months, twelve months, and/or the like. The configurable time period may vary to adapt to various needs and circumstances. The moved/changed database may also have access to external information/data source computing entities 120 that can provide information/data regarding customer moves, such as property records, tax records, phone number directories, criminal records, address databases, credit records, bank deed records, government records (including postal records), medical records, purchasing records, product registration records, birth records, other publicly available sources, and/or the like. In one embodiment, the carrier/transporter computing entity 100 can query a moved/changed database using name information/data and/or address information/data to determine/identify whether a record/entry exists for the name information/data and/or the address information/data. This may be based on all or portions of the name information/data and/or all or portions of the address information/data. If a record/entry exists for the name information/data and/or the address information/data, the carrier/transporter computing entity 100 can create/generate an exception for the pick-up or delivery at the address (Block 415 of FIG. 4). As will be recognized, a variety of other approaches and techniques can be used to adapt to various needs and circumstances.

In one embodiment, if no exceptions exist for a given address (e.g., exceptions for a pick-up or delivery), the carrier/transporter computing entity 100 can allow for normal pick-up or delivery of the item/shipment 102 and electronically indicate the same (Block 435 of FIG. 4). In contrast, if an exception exists for a given address, the carrier/transporter computing entity 100 can initiate one or more audit processes of the address information/data (Block 420 of FIG. 4). As will be recognized, a variety of other approaches and techniques can be used to adapt to various needs and circumstances.

7. Address Audits

In one embodiment, if no exceptions exist for a given address (e.g., exceptions for a pick-up or delivery), the carrier/transporter computing entity 100 can allow for normal pick-up or delivery of the item/shipment 102 and electronically indicate the same (Block 435 of FIG. 4). In contrast, if an exception exists for a given address (e.g., exceptions for a pick-up or delivery), the carrier/transporter computing entity 100 can initiate one or more audit processes (e.g., primary audits and/or second audits) of the address information/data and/or name information/data (Block 420 of FIG. 4). The audits may be fully automated, semi-automated, manual, combinations thereof, and/or the like.

a. Primary Audit: Predicting Correct Address Information/Data

In one embodiment, a primary auditing of address information/data and/or name information/data may comprise the carrier/transporter computing entity 100 (e.g., via the learning platform/module) automatically predicting the address information/data for addresses with one or more exceptions (Blocks 420, 422, 430, and 435 of FIG. 4). Continuing with the above example, assume the carrier/transporter computing entity 100 created/generated an exception for a pick-up or a delivery to 122 Main Street, Any Town, Georgia 30328, because it determined/identified that no successful deliveries or pick-ups have occurred at 122 Main Street, Any Town, Georgia 30328—John Doe's actual residential address is 123 Main Street, Apartment 1A, Any Town, Georgia 30328.

In one embodiment, as part of a primary audit process to predict the correct address information/data for a pick-up or delivery, the carrier/transporter computing entity 100 (e.g., via the learning platform/module) can determine/identify one or more confidence levels associated with the address information/data and/or name information/data. In one embodiment, if one or more confidence levels satisfy (e.g., meet or exceed) one or more configurable confidence levels, the carrier/transporter computing entity 100 (e.g., via the learning platform/module) can predict that the identified address information/data is correct (Block 422 of FIG. 4) and override the exception—allowing the corresponding pick-up or delivery and electronically indicating the same. Similarly, if one or more confidence levels do not satisfy (e.g., do not meet or exceed) one or more configurable confidence levels, the carrier/transporter computing entity 100 (e.g., via the learning platform/module) can determine/identify that the identified address information/data is not correct. In this example, the address 122 Main Street, Any Town, Georgia 30328 is not yet associated with any confidence levels. Thus, as this part of the primary audit process, the carrier/transporter computing entity 100 (e.g., via the learning platform/module) determines/identifies that the identified address information/data is not correct. As will be recognized, a variety of other approaches and techniques can be used to adapt to various needs and circumstances.

In one embodiment, as part of a primary audit process to predict the correct address information/data for a pick-up or delivery, the carrier/transporter computing entity 100 (e.g., via the learning platform/module) can determine/identify whether there have been any previous predictions for the address information/data and/or name information/data. In such cases, the carrier/transporter computing entity 100 (e.g., via the learning platform/module) determine/identify the previous predictions for the address information/data and/or name information/data and determine/identify whether they were successful or unsuccessful. If previous successful predictions have been recorded, the carrier/transporter computing entity 100 (e.g., via the learning platform/module) can make/initiate/instruct the same prediction for the address information/data in future occurrences. This example, assumes that no previous predictions have occurred for this address information/data and/or name information/data. This, in effect, links potentially incorrect address information/data and/or name information/data to potentially correct address information/data and/or name information/data (e.g., see FIG. 9). As will be recognized, a variety of other approaches and techniques can be used to adapt to various needs and circumstances.

In one embodiment, as part of the primary audit process to predict the correct address information/data for a pick-up or delivery, the carrier/transporter computing entity 100 (e.g., via the learning platform/module) can determine/identify whether pick-ups or deliveries to the same or similar consignor/consignee have occurred on the same or a similar street, within address ranges on the same or a similar street, within the same zip code, within the same city or town, at the same entity name (e.g., The Home Depot), within a zone of confidence around the provided address information/data, within a geofence around the provided address information/data, and/or the like. In this example, the carrier/transporter computing entity 100 (e.g., via the learning platform/module) can search the historical item/shipment database for pick-ups or deliveries to John Doe on Main Street in Any Town, Georgia, for example, or ±50 street address numbers of 122 on Main Street in Any Town, Georgia (e.g., 72-172). This would result in the carrier/transporter computing entity 100 (e.g., via the learning platform/module) determining/ identifying that one or more pick-ups and/or deliveries (e.g., visits) have taken place for a Mr. John Doe at 123 Main Street, Apartment 1A, Any Town, Georgia 30328. The carrier/transporter computing entity 100 (e.g., via the learning platform/module) can also determine/identify the various confidence levels associated with the Mr. Doe's address as shown in FIGS. 6-8. If within the configurable threshold, the carrier/transporter computing entity 100 (e.g., via the learning platform/module) can predict that the pick-up or delivery for 122 on Main Street in Any Town, Georgia, is actually for 123 Main Street, Apartment 1A, Any Town, Georgia 30328. As will be recognized, a variety of other approaches and techniques can be used to adapt to various needs and circumstances.

In one embodiment, with the predicted address information/data, an appropriate computing entity (e.g., carrier/ transporter computing entity 100, user computing entity 110, payment computing entity 115, external information/data source computing entity 120, and/or the like) can update/ correct the item/shipment information/data to reflect the predicted address information/data. In the context of an e-commerce transaction prior to purchase, the customer can be notified and/or prompted to confirm the predicted address information/data. In the context of a third party requesting validation of address information/data and/or name information/data, the carrier/transporter computing entity 100 (e.g., via the learning platform/module) can provide the predicted address information/data and/or name information/data. In the context of an item/shipment 102 that is already in the carrier's transportation and logistics network, carrier/transporter operator/personnel sorting items or loading delivery vehicles can scan the item/shipment identifier (e.g., user computing entity 110) for the item/shipment 102. In certain embodiments, this may include electronically indicating that a new label (and/or item/shipment identifier) needs to be affixed to the item/shipment 102 at some point during handling of the item/shipment 102 within the carrier's transportation and logistics network. In such a case, the item/shipment 102 can then be transported and delivered with the new label by the carrier and delivered without requiring an in-person signature.

In one embodiment, if address information/data has been predicted, the carrier/transporter computing entity 100 can allow for pick-up or delivery of the item/shipment 102 and electronically indicate the same (Block 435 of FIG. 4). However, even if there are no predictions for the address information/data, the carrier/transporter computing entity 100 can allow for pick-up or delivery of the item/shipment 102 and electronically indicate the same (Block 435 of FIG. 4). In certain embodiments, this can allow carrier/transporter operators/personnel with an opportunity to attempt the pickup or delivery and allow the learning module to track the result (and determine/identify a confidence level). In either case, the carrier/transporter computing entity 100 can store information/data in the historical item/shipment database (with records/entries of successful and unsuccessful pickups and deliveries (e.g., visits) for a configurable time period and/or confidence levels) indicating whether the item/shipment 102 was successfully picked up or delivered and/or assign or update the appropriate confidence levels correspondingly.

Moreover, the carrier/transporter computing entity 100 can update or associate the potentially incorrect address information/data and/or name information/data with the predicted or potentially correct address information/data and/or name information/data. This, in effect, links potentially incorrect address information/data and/or name information/data to potentially correct address information/data and/or name information/data (e.g., see FIG. 9). The carrier/ transporter computing entity 100 (e.g., via the learning platform/module) can also determine/identify whether the predicted address information/data was correct or incorrect based on whether the pick-up or delivery was successful or unsuccessful, whether feedback was received from carrier/ transporter operators/personnel, and/or the like. Further, the carrier/transporter computing entity 100 (e.g., via the learning platform/module) can then update the one or more one or more confidence levels with the address information/data and/or name information/data (e.g., via the learning platform/module) based on the same. As previously discussed, the carrier/transporter computing entity 100 (e.g., via the learning platform/module) can use various factors to update the confidence levels—such as primary or secondary audits, signatures being obtained for pick-ups or deliveries, successful pick-ups or deliveries, unsuccessful pick-ups or deliveries, carrier/transporter operators/personnel being within a zone of confidence at pick-up or delivery locations of previous successful pick-ups or deliveries, corrective input from carrier/transporter operators/personnel, customer feedback, claims for unsuccessful pick-ups and/or deliveries (e.g., visits), and/or the like. As will be recognized, a variety of other approaches and techniques can be used to adapt to various needs and circumstances.

b. Primary Audit: Predicting Missing Address Information/ Data

In one embodiment, a primary auditing of address information/data and/or name information/data may comprise the carrier/transporter computing entity 100 (e.g., via the learning platform/module) automatically predicting the missing or potentially missing address information/data for addresses with one or more exceptions (Blocks 420, 422, 430, and 435 of FIG. 4). Continuing with the above example, assume the carrier/transporter computing entity 100 created/ generated an exception for a pick-up or a delivery to 123 Main Street, Any Town, Georgia 30328, because it determined/identified that it was missing secondary address information/data—John Doe's actual residential address is 123 Main Street, Apartment 1A, Any Town, Georgia 30328.

In one embodiment, as part of a primary audit process to predict the missing/incomplete address information/data for a pick-up or delivery, the carrier/transporter computing entity 100 (e.g., via the learning platform/module) can determine/identify one or more confidence levels associated with the address information/data and/or name information/ data. In one embodiment, if one or more confidence levels satisfy (e.g., meet or exceed) one or more configurable confidence levels, the carrier/transporter computing entity 100 (e.g., via the learning platform/module) can predict that the identified address information/data is not missing/incomplete (Block 422 of FIG. 4) and override the exception—allowing the corresponding pick-up or delivery and electronically indicating the same. Similarly, if one or more confidence levels do not satisfy (e.g., do not meet or exceed) one or more configurable confidence levels, the carrier/ transporter computing entity 100 (e.g., via the learning platform/module) can determine/identify that the secondary address information/data is missing/incomplete. In this example, there may be multiple addresses associated with 123 Main Street, Any Town, Georgia 30328, but only one at that same address associated with Mr. John Doe. In such a case, the carrier/transporter computing entity 100 (e.g., via the learning platform/module) can predict that the missing/incomplete address information/data is Apartment 1A. As will be recognized, a variety of other approaches and techniques can be used to adapt to various needs and circumstances.

In one embodiment, as part of a primary audit process to predict the correct address information/data for a pick-up or delivery, the carrier/transporter computing entity 100 (e.g., via the learning platform/module) can determine/identify whether there have been any previous predictions for the address information/data and/or name information/data. In such cases, the carrier/transporter computing entity 100 (e.g., via the learning platform/module) determine/identify the previous predictions for the address information/data and/or name information/data and determine/identify whether they were successful or unsuccessful. If previous successful predictions have been recorded, the carrier/transporter computing entity 100 (e.g., via the learning platform/module) can make/initiate/instruct the same prediction for the address information/data in future occurrences. Thus, the next time there is a pick-up or delivery for Mr. John Doe that is missing/incomplete his secondary address information/data, the carrier/transporter computing entity 100 (e.g., via the learning platform/module) will determine/identify the previous prediction. This, in effect, links potentially missing/incomplete address information/data and/or name information/data to one or more predicted address information/data and/or name information/data (e.g., see FIG. 9). As will be recognized, a variety of other approaches and techniques can be used to adapt to various needs and circumstances.

In one embodiment, as part of the primary audit process to predict the correct address information/data for a pick-up or delivery, the carrier/transporter computing entity 100 (e.g., via the learning platform/module) can determine/identify whether pick-ups or deliveries have occurred to the same address without secondary address information/data. In this example, the carrier/transporter computing entity 100 (e.g., via the learning platform/module) can search the historical item/shipment database for pick-ups or deliveries to 123 Main Street in Any Town, Georgia, for example. This would result in the carrier/transporter computing entity 100 (e.g., via the learning platform/module) determining/identifying that one or more pick-ups and/or deliveries (e.g., visits) have taken place for to 123 Main Street, Any Town, Georgia 30328, without secondary address information/data. This, for instance, may be because the location is an apartment complex that allows deliveries to residents at the office. In such a case, the secondary address information/data may not be necessary for a successful delivery. Thus, the carrier/transporter computing entity 100 (e.g., via the learning platform/module) can predict that the item/shipment can be picked up or delivered without the secondary address information/data. The same may hold true for large or well-known businesses or regular customers, such as pick-ups or deliveries to The Home Depot, Amazon Returns, and/or the like. As will be recognized, a variety of other approaches and techniques can be used to adapt to various needs and circumstances.

In one embodiment, with the predicted address information/data, an appropriate computing entity (e.g., carrier/transporter computing entity 100, user computing entity 110, payment computing entity 115, external information/data source computing entity 120, and/or the like) can update/correct the item/shipment information/data to reflect the predicted address information/data as previously described if necessary. The carrier/transporter computing entity 100 can update or associate any missing/incomplete address information/data and/or name information/data with the predicted address information/data and/or name information/data. The carrier/transporter computing entity 100 (e.g., via the learning platform/module) can also determine/identify whether the predicted address information/data was correct or incorrect based on whether the pick-up or delivery was successful or unsuccessful, whether feedback was received from carrier/transporter operators/personnel, and/or the like. The address information/data can also be updated by customers via web/phone/other channels. For example, once the carrier/transporter computing entity 100 (e.g., via the learning platform/module) identifies a problem with address information/data, the carrier/transporter computing entity 100 (e.g., via the learning platform/module) can indicate a web tracking exception and allow for customer updates as well.

Further, the carrier/transporter computing entity 100 (e.g., via the learning platform/module) can then update the one or more one or more confidence levels with the address information/data and/or name information/data (e.g., via the learning platform/module) based on the same. As will be recognized, a variety of other approaches and techniques can be used to adapt to various needs and circumstances.

In one embodiment, if address information/data has been predicted, the carrier/transporter computing entity 100 can allow for pick-up or delivery of the item/shipment 102 (Block 435 of FIG. 4). However, even if there are no predictions for the address information/data, the carrier/transporter computing entity 100 can allow for pick-up or delivery of the item/shipment 102 (Block 435 of FIG. 4). In certain embodiments, this can allow carrier/transporter operators/personnel with an opportunity to attempt the pick-up or delivery and allow the learning module to track the result (and determine/identify a confidence level). In either case, the carrier/transporter computing entity 100 can store information/data in the historical item/shipment database (with records/entries of successful and unsuccessful pick-ups and deliveries (e.g., visits) for a configurable time period and/or confidence levels) indicating whether the item/shipment 102 was successfully picked up or delivered and/or assign or update the appropriate confidence levels correspondingly.

c. Primary Audit: Predicting Moved/Changed Address Information/Data

In one embodiment, a primary auditing of address information/data and/or name information/data may comprise the carrier/transporter computing entity 100 (e.g., via the learning platform/module) automatically predicting address information/data for exceptions as a result of being determined/identified in a moved/changed database (Blocks 420, 422, 430, and 435 of FIG. 4). Continuing with the above example, assume the carrier/transporter computing entity 100 created/generated an exception for a pick-up or a delivery to 123 Main Street, Apartment 1A, Any Town, Georgia 30328, because it determined/identified that Mr. John Doe at that address moved based at least in part on a moved/changed database.

In one embodiment, as part of a primary audit process to predict the correct address information/data for a pick-up or delivery, the carrier/transporter computing entity 100 (e.g., via the learning platform/module) can determine/identify whether there have been any previous predictions for the address information/data and/or name information/data or whether the customer has updated/changed his or her address information/data. In such cases, the carrier/transporter computing entity 100 (e.g., via the learning platform/module) determine/identify the previous predictions or corrections for the address information/data and/or name information/data and determine/identify whether they were successful or unsuccessful. If previous successful predictions or corrections have been recorded (e.g., linked), the carrier/transporter computing entity 100 (e.g., via the learning platform/module) can make/initiate/instruct the same prediction or correction for the address information/data in future occurrences and/or update any confidence levels. Thus, the next time there is a pick-up or delivery for Mr. John Doe at the address listed in the moved/changed database, the carrier/transporter computing entity 100 (e.g., via the learning platform/module) can determine/identify the previous prediction or correction and update the item/shipment information/data in the same manner. This, in effect, links moved/changed address information/data and/or name information/data to the predicted or corrected address information/data (e.g., see FIG. 9). As will be recognized, a variety of other approaches and techniques can be used to adapt to various needs and circumstances.

In one embodiment, with the predicted address information/data, an appropriate computing entity (e.g., carrier/transporter computing entity 100, user computing entity 110, payment computing entity 115, external information/data source computing entity 120, and/or the like) can update/correct the item/shipment information/data to reflect the predicted or corrected address information/data as previously described if necessary. The carrier/transporter computing entity 100 can update or associate any moved/changed address information/data and/or name information/data with the predicted address information/data. The carrier/transporter computing entity 100 (e.g., via the learning platform/module) can also determine/identify whether the predicted or corrected address information/data was correct or incorrect based on whether the pick-up or delivery was successful or unsuccessful, whether feedback was received from carrier/transporter operators/personnel, and/or the like. Further, the carrier/transporter computing entity 100 (e.g., via the learning platform/module) can then update the one or more one or more confidence levels with the address information/data and/or name information/data (e.g., via the learning platform/module) based on the same. As will be recognized, a variety of other approaches and techniques can be used to adapt to various needs and circumstances.

In one embodiment, if address information/data has been predicted or corrected, the carrier/transporter computing entity 100 can allow for pick-up or delivery of the item/shipment 102 (Block 435 of FIG. 4). Similarly, if there are no predictions or corrections for the address information/data, the carrier/transporter computing entity 100 can allow for pick-up or delivery of the item/shipment 102 (Block 435 of FIG. 4). In either case, the carrier/transporter computing entity 100 can store information/data in the historical item/shipment database (with records/entries of successful and unsuccessful pick-ups and deliveries (e.g., visits) for a configurable time period) indicating whether the item/shipment 102 was successfully picked up or delivered.

d. Secondary Audit: Correcting Address Information/Data and/or Name Information/Data In one embodiment, a secondary auditing of an address with an exception may comprise automatically contacting the consignor and/or consignee of the item/shipment 102 to request corrected item/shipment information/data (Blocks 420, 425, 430, and 435 of FIG. 4). For example, the carrier/transporter computing entity 100 may store or have access to various customer (e.g., consignee and/or consignor) profiles comprising communication preferences regarding items/shipments 102 to be picked up or delivered. For example, the communication preferences may provide customers (e.g., consignors and/or consignees) with the ability to electronically communicate with the carrier/transporter at various stages of the pick-up and/or delivery process. The customer (e.g., consignee and/or consignor) profiles can identify one or more communication formats for communicating with the customer. The communication formats may include text messages (e.g., SMS and/or MMS), email messages, voice messages, and/or a variety of other messages in various communication formats. In addition to identifying one or more communication formats, customer (e.g., consignee and/or consignor) profiles may identify the corresponding electronic destination addresses to be used in providing information regarding items/shipments 102 to be picked up and/or delivered. For instance, for text messages, the customer may provide one or more cellular phone numbers. For email messages, the customer may provide one or more email addresses. And for voice messages, the customer may provide one or more cellular or landline phone numbers. Additionally, in one embodiment, validation operations can be performed with respect to each input destination address—to ensure their accuracy. In one embodiment, the carrier/transporter computing entity 100 can automatically generate one or more messages requesting information/data regarding an item/shipment 102 to be picked up or delivered in compliance with the customer's communication preferences. Similarly, the carrier/transporter computing entity 100 can automatically transmit the one or messages to the electronic destination addresses in compliance with the customer's communication preferences. For example, the carrier/transporter computing entity 100 may generate/create and transmit an email message to John Doe's (or the consignor) email address and a text message to John Doe's (or the consignor) cellular phone requesting his correct street address or apartment number. In one embodiment, the customer (e.g., operating a user computing entity 110) can respond to the messages/notifications with necessary information. This approach allows the carrier/transporter and the customer (e.g., consignor and/or consignee) to interact with one another to determine/identify the updated/corrected address information/data. As will be recognized, a variety of other approaches and techniques can be used to adapt to different needs and circumstances—some of which are further described in U.S. application Ser. No. 14/025,893, which is hereby incorporated in its entirety by reference.

In one embodiment, with the updated/corrected address information/data, an appropriate computing entity (e.g., carrier/transporter computing entity 100, user computing entity 110, payment computing entity 115, external information/data source computing entity 120, and/or the like) can update/correct the item/shipment information/data to reflect the updated/corrected address information/data. In the context of an e-commerce transaction prior to purchase, the customer can be notified and/or prompted to confirm the updated/corrected address information/data. In the context of a third party requesting validation of address information/data and/or name information/data, the carrier/transporter computing entity 100 (e.g., via the learning platform/module) can provide the corrected/updated address information/data and/or name information/data. In the context of an item/shipment 102 that is already in the carrier's transportation and logistics network, carrier/transporter operator/personnel sorting items or loading delivery vehicles can scan the item/shipment identifier (e.g., user computing entity 110) for the item/shipment 102. In response, a user computing entity 110 can provide the carrier/transporter operator/personnel with an indication that the address information/data for the item/shipment 102 has been updated/corrected. In certain embodiments, this may include electronically indicating that a new label (and/or item/shipment identifier) needs to be affixed to the item/shipment 102. The item/shipment 102 can then be transported and delivered with the new label by the carrier and delivered without requiring an in-person signature.

In one embodiment, if address information/data has been updated/corrected, the carrier/transporter computing entity 100 can allow for pick-up or delivery of the item/shipment 102 (Block 435 of FIG. 4). Similarly, if there are no updates/corrections to the address information/data the carrier/transporter computing entity 100 can allow for pick-up or delivery of the item/shipment 102 and electronically indicate the same (Block 435 of FIG. 4). In either case, the carrier/transporter computing entity 100 can store information/data in the historical item/shipment database (with records/entries of successful and unsuccessful pick-ups and deliveries (e.g., visits) for a configurable time period and/or confidence levels) indicating whether the item/shipment 102 was successfully picked up or delivered.

As will be recognized, a variety of other approaches and techniques can be used to adapt to various needs and circumstances. In various embodiments, one technical advantage this approach includes is actually determining/identifying and providing the any missing/incomplete or incomplete secondary address information/data—instead of simply assuming the address information/data is accurate because it is in range.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of delivering an item having missing or incorrect delivery information, the method comprising:
    creating a first electronic address record having a plurality of first address elements associated with a first address and a second electronic address record having a plurality of second address elements associated with a second address;
    based on one or more historical attempted deliveries to the first address and the second address, generating at least one confidence level for each of the plurality of the first address elements and the plurality of second address elements, the at least one confidence level indicating an accuracy of the plurality of the first address elements and the plurality of second address elements, wherein:
    a successful delivery of the one or more historical attempted deliveries to the second address increases the at least one confidence level for the plurality of second address elements, and
    an unsuccessful delivery of the one or more historical attempted deliveries to the second address decreases the at least one confidence level for the plurality of second address elements;
    receiving electronic delivery information indicating that an item is to be delivered to a delivery address, wherein the electronic delivery information at least includes a consignee name of an intended recipient;
    after receiving the electronic delivery information, parsing the delivery address in the electronic delivery information into a plurality of third address elements, the plurality of third address elements including at least the consignee name and one or more of a street number, a street name, a suite type, or a suite number;
    determining whether one or more of a plurality of exception rules applies to the electronic delivery information by comparing the plurality of third address elements to the first electronic address record and determining that the at least one confidence level for the first address elements is below a threshold confidence level, wherein the plurality of exception rules includes incorrect address information exception rule, missing address information exception rule, or changed address information exception rule, and wherein determining whether the one or more of the plurality of exception rules applies is performed in parallel, and wherein performing the determination in parallel comprises determining whether a first exception rule of the plurality of exception rules applies, and irrespective of whether the first exception rule applies, determining whether a second exception rule of the plurality of exception rules applies;
    responsive to determining whether the one or more of the plurality of exception rules applies, predicting that the item is to be delivered to the second address by comparing the plurality of third address elements to the second electronic address record and determining that the at least one confidence level for the second address elements is above the threshold confidence level;
    based on predicting the item is to be delivered to the second address, updating the electronic delivery information with the second address;
    generating a label that has an indication of the second address;
    affixing the label to the item; and
    delivering the item to the second address based on the indication of the second address of the label.

2. The method of claim 1 further comprising:
    determining a number of successful historical visits to the second address; and
    responsive to determining the number of successful historical visits to the second address, increasing the at least one confidence level for the second address elements.

3. The method of claim 1 further comprising:
    determining a number of unsuccessful historical visits to the second address; and
    responsive to determining the number of unsuccessful historical visits to the second address, decreasing the at least one confidence level for the second address elements.

4. The method of claim 1, wherein the at least one confidence level for both the plurality of first address elements and the plurality of second address elements is expressed as a percentage or a number.

5. A system for facilitating delivery, through a carrier, of an item having missing or incorrect delivery information, the system comprising:
- at least one processor; and
- at least one memory including program code that, when executed by the at least one processor, causes the at least one processor to:
- create a first electronic address record having a plurality of first address elements associated with a first address and a second electronic address record having a plurality of second address elements associated with a second address;
- based on one or more historical attempted deliveries to the first address and the second address, generate at least one confidence level for each of the plurality of first address elements and the plurality of second address elements, the at least one confidence level indicating an accuracy of the plurality of first address elements and the plurality of second address elements, wherein:
- a successful delivery of the one or more historical attempted deliveries to the second address increases the at least one confidence level for the plurality of second address elements, and
- an unsuccessful delivery of the one or more historical attempted deliveries to the second address decreases the at least one confidence level for the plurality of second address elements;
- receive electronic delivery information indicating that an item is to be delivered to a delivery address, wherein the electronic delivery information at least includes a consignee name of an intended recipient;
- after receiving the electronic delivery information, parse the delivery address in the electronic delivery information into a plurality of third address elements, the plurality of third address elements including at least the consignee name and one or more of a street number, a street name, a suite type, and a suite number;
- determine whether one or more of a plurality of exception rules applies to the electronic delivery information by comparing the plurality of third address elements to the first electronic address record and determining that the at least one confidence level for the first address elements is below a threshold confidence level, wherein determining whether the one or more of the plurality of exception rules applies is performed in parallel, and wherein performing the determination in parallel comprises determining whether a first exception rule of the plurality of exception rules applies, and irrespective of whether the first exception rule applies, determining whether a second exception rule of the plurality of exception rules applies;
- responsive to determining whether the one or more of the plurality of exception rules applies, predict the item is to be delivered to the second address by comparing the plurality of third address elements to the second electronic address record and determining that the at least one confidence level for the second address elements is above the threshold confidence level;
- based on predicting the item is to be delivered to the second address, update the electronic delivery information with the second address; and
- facilitate delivery of the item to the second address by generating a label that has an indication of the second address, wherein the label is generated for affixation to the item, and wherein the item is delivered based on the indication of the second address on the label.

6. The system of claim 5, further comprising:
- determine a number of successful historical visits to the second address; and
- responsive to determining the number of successful historical visits to the second address, increasing the at least one confidence level for the second address elements.

7. The system of claim 5, further comprising:
- determine a number of unsuccessful historical visits to the second address; and
- responsive to determining the number of unsuccessful historical visits to the second address, decreasing the at least one confidence level for the second address elements.

8. A computer program product comprising at least one non-transitory computer-readable storage medium having computer-readable program code stored therein that, when executed by a processor, causes the processor to perform a method of facilitating delivery, through a carrier, of an item having missing or incorrect delivery information, the method comprising:
- a first electronic address record having a plurality of first address elements associated with a first address and a second electronic address record having a plurality of second address elements associated with a second address;
- based on one or more historical attempted deliveries to the first address and the second address, generating at least one confidence level for each of the plurality of first address elements and the plurality of second address elements the at least one confidence level indicating an accuracy of the plurality of first address elements and the plurality of second address elements, wherein:
- a successful delivery of the one or more historical attempted deliveries to the second address increases the at least one confidence level for the plurality of second address elements, and
- an unsuccessful delivery of the one or more historical attempted deliveries to the second address decreases the at least one confidence level for the plurality of second address elements;
- receiving electronic delivery information indicating that an item is to be delivered to a delivery address, wherein the electronic delivery information at least includes a consignee name of an intended recipient;
- after receiving the electronic delivery information, parsing the delivery address in the electronic delivery information into a plurality of third address elements, the plurality of third address elements including at least the consignee name and one or more of a street number, a street name, a suite type, or a suite number;
- determining whether one or more exception rules of a plurality of exception rules applies to the electronic delivery information by comparing the plurality of third address elements to the first electronic address record and determining that the at least one confidence level for the first address elements is below a threshold confidence level, wherein the plurality of exception rules includes incorrect address information exception rule, missing address information exception rule, or changed address information exception rule, and wherein determining whether the one or more exception rules of the plurality of exception rules applies is performed using a defined execution order of the plurality of exception rules, the defined execution order including a sequence in which the determination of each of the exception rules of the plurality of exception rules performed;

responsive to determining whether the one or more exception rules apply, predicting the item is to be delivered to the second address by comparing the plurality of third address elements to the second electronic address record and determining that the at least one confidence level for the second address elements is above the threshold confidence level;

based on predicting the item is to be delivered to the second address, updating the electronic delivery information with the second address; and facilitating delivery of the item to the second address by generating a label that has an indication of the second address, wherein the label is generated for affixation to the item, and wherein the item is delivered based on the indication of the second address on the label.

9. The computer program product of claim 8 further comprising:

determining a number of successful historical visits to the second address; and responsive to determining the number of successful historical visits to the second address, increasing the at least one confidence level for the second address elements.

10. The computer program product of claim 8 further comprising:

a number of unsuccessful historical visits to the second address; and responsive to determining the number of unsuccessful historical visits to the second address, decreasing the at least one confidence level for the second address elements.

11. The computer program product of claim 8, wherein the at least one confidence level for both the plurality of first address elements and the plurality of second address elements is expressed as a percentage or a number.

12. The method of claim 1, wherein each exception rule of the one or more exception rules comprises an execution status that indicates whether the exception rule is set to execute.

13. The method of claim 1, further comprising updating the at least one confidence level for the plurality of first address elements or the plurality of second address elements based on determining the one or more exception rules apply.

14. The method of claim 1, further comprising determining delivery of the item to the second address was successful, and based on determining that the delivery to the second address was successful, updating the at least one confidence level for the plurality of first address elements or the plurality of second address elements.

15. The method of claim 1, further comprising, based on predicting the item is to be delivered to the second address, storing a prediction associated with the plurality of third address elements in the first electronic address record or the second electronic address record.

16. The method of claim 1, wherein predicting the item is to be delivered to the second address is further determined by comparing the plurality of third address elements to one or more historical predictions stored in the first electronic address record or the second electronic address record.

17. The system of claim 5, further comprising:

prior to updating the electronic delivery information with the second address, send a notification to a consignee requesting a confirmation to deliver the item to the second address; and based on sending the notification, receive the confirmation from the consignee to deliver the item to the second address.

18. The system of claim 5, further comprising validating the second address by accessing more than one external information source and comparing information received from the more than one external information source to the second electronic address record, the more than one external information source selected from a group consisting of property records, tax records, phone number directories, criminal records, credit records, bank deed records, medical records, purchasing records, product registration records, and birth records.

19. The method of claim 1, wherein determining whether the one or more of the plurality of exception rules applies is performed by applying the plurality of exception rules in sequence, wherein applying the plurality of exception rules in sequence comprises determining whether a first exception rule of the plurality of exception rules applies, and based on determining that the first exception rule applies, applying the first exception rule to predict the item is to be delivered to the second address, and based on applying the first exception rule, not determining whether a second exception rule of the plurality of exception rules applies.

* * * * *